US008098732B2

(12) United States Patent
Robertson

(10) Patent No.: US 8,098,732 B2
(45) Date of Patent: Jan. 17, 2012

(54) SYSTEM FOR AND METHOD OF TRANSCODING VIDEO SEQUENCES FROM A FIRST FORMAT TO A SECOND FORMAT

(75) Inventor: Mark A. Robertson, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1133 days.

(21) Appl. No.: 11/974,091

(22) Filed: Oct. 10, 2007

(65) Prior Publication Data

US 2009/0097560 A1    Apr. 16, 2009

(51) Int. Cl.
*H04N 7/12* (2006.01)
(52) U.S. Cl. .................. 375/240.16; 375/240.24
(58) Field of Classification Search .............. None
See application file for complete search history.

(56) References Cited

U.S. PATENT DOCUMENTS

| | | | | |
|---|---|---|---|---|
| 6,434,196 | B1 * | 8/2002 | Sethuraman et al. | 375/240.12 |
| 6,647,061 | B1 * | 11/2003 | Panusopone et al. | 375/240.12 |
| 6,870,886 | B2 * | 3/2005 | Challapali et al. | 375/240.24 |
| 7,310,371 | B2 * | 12/2007 | Cote et al. | 375/240.15 |
| 7,469,007 | B2 * | 12/2008 | Tahara et al. | 375/240.02 |
| 7,526,027 | B2 * | 4/2009 | Sekiguchi et al. | 375/240.16 |
| 2002/0001343 | A1 * | 1/2002 | Challapali et al. | 375/240.01 |
| 2005/0232497 | A1 * | 10/2005 | Yogeshwar et al. | 382/232 |
| 2006/0039473 | A1 * | 2/2006 | Filippini et al. | 375/240.16 |
| 2006/0120453 | A1 | 6/2006 | Ikeda et al. | 375/240.16 |
| 2007/0030911 | A1 * | 2/2007 | Yoon | 375/240.25 |
| 2008/0137753 | A1 * | 6/2008 | He | 375/240.24 |
| 2008/0187046 | A1 * | 8/2008 | Joch et al. | 375/240.16 |
| 2008/0212680 | A1 * | 9/2008 | Rault | 375/240.16 |
| 2010/0111188 | A1 * | 5/2010 | Takahashi et al. | 375/240.16 |

FOREIGN PATENT DOCUMENTS

| | | |
|---|---|---|
| WO | WO 2004/093461 | 10/2004 |
| WO | WO 2004/093462 | 10/2004 |

OTHER PUBLICATIONS

Bo Shen, Submacroblock Motion Compensation for Fast Down-Scale Transcoding of Compressed Video, IEEE Transactions on Circuits and Systems for Video Technology, vol. 15, No. 10, pp. 1291-1302, Oct. 2005.
Hari Kalva, Issues in H.264/MPEG-2 Video Transcoding, Computer Science and Engineering, Florida Atlantic University, Boca Raton, FL, pp. 657-659, IEEE 2004.

* cited by examiner

*Primary Examiner* — Michael J Moore, Jr.
(74) *Attorney, Agent, or Firm* — Haverstock & Owens LLP

(57) ABSTRACT

The present invention discloses systems for and methods of transcoding first video data in a first format, such as AVC, into second video data in a second format, such as MPEG-2. A method in accordance with the present invention disables deblocking filters, bypasses macroblock encoding for certain picture types, such as B-pictures, and re-uses motion vectors. In one embodiment, motion vectors for the second video data are set substantially equal to motion vectors for the first video data, when the two differ by less than a threshold value. In other embodiments, only macroblocks that contain all zero-valued blocks bypass the transcoding process, thereby simplifying the transcoding process further. Other embodiments further simplify the transcoding process by requiring that B-pictures are not used as reference pictures, reference pictures in the second video data are restricted to be the same as reference pictures in the first video data, and bi-predictions are not allowed.

30 Claims, 21 Drawing Sheets

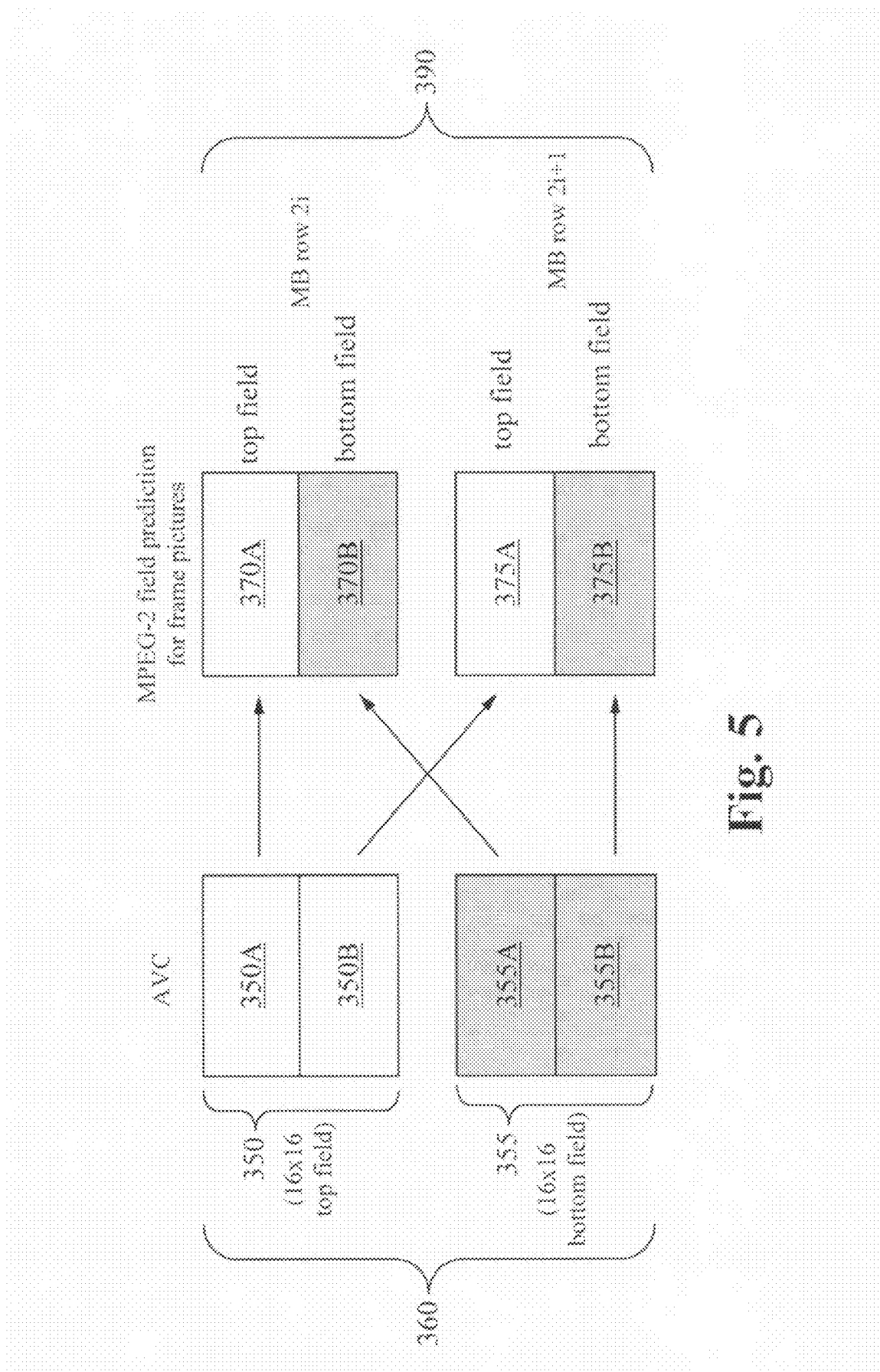

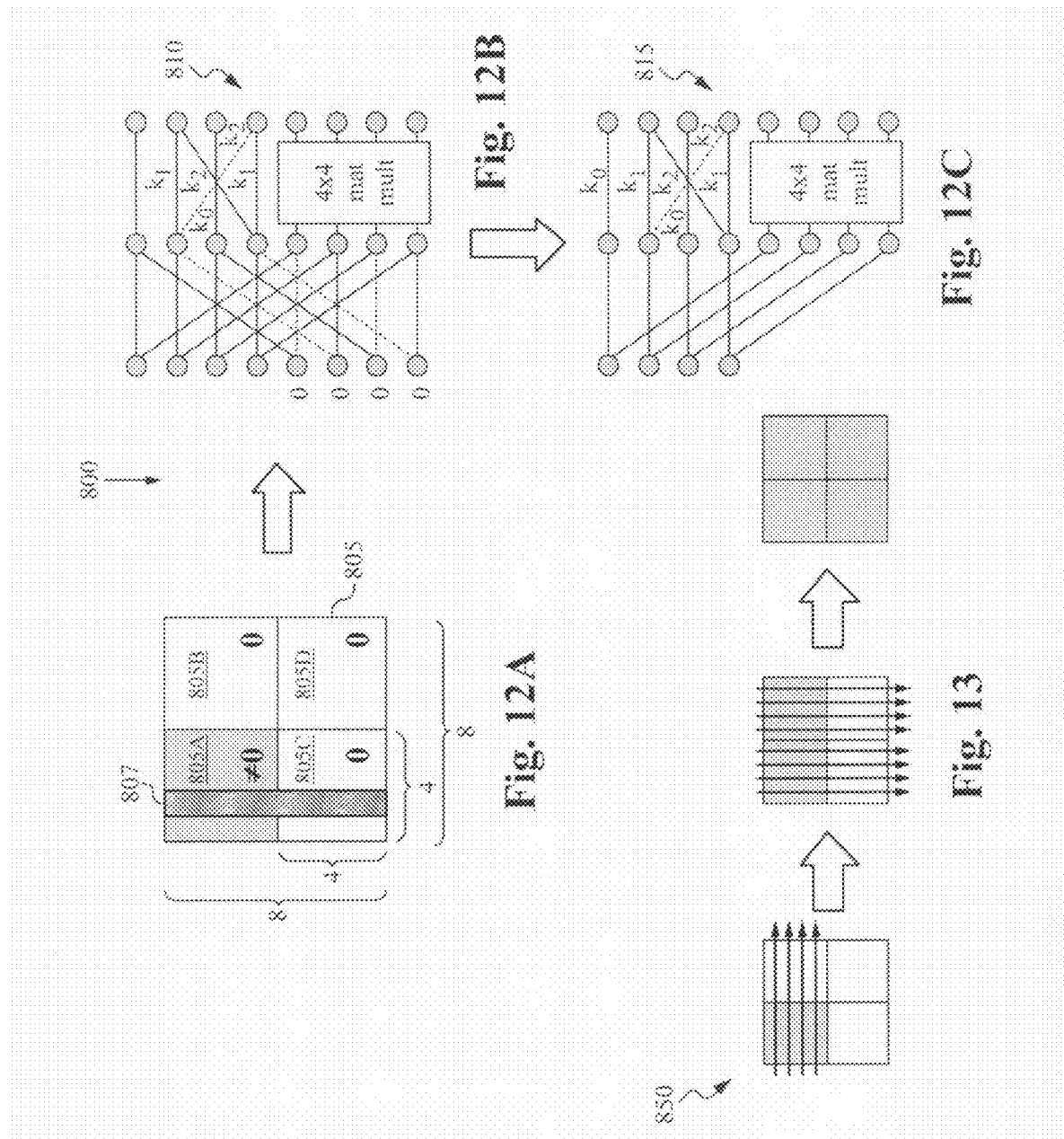

Frame-type Mapping (1)

| | AVC Frame Picture Type | MPEG-2 Frame Picture Type | | AVC Field Picture Types, TOP:BOT | MPEG-2 Frame Picture Type |
|---|---|---|---|---|---|
| 901→ | I | I | 911→ | I:P, I:I, P:I | I |
| 903→ | P, $B_R$ | P | 913→ | P:P, $B_R:B_R$ | P |
| 905→ | B | B | 915→ | B:B | B |
| | Table 5 | | | Table 6 | |

| P Frames | | |
|---|---|---|
| Top Field | Bottom Field | Action |
| Good MV from AVC | Good MV from AVC | 1. See if field MV's simplify to frame<br>2. Optional: Refine field/frame MV |
| Good MV from AVC | No good MV from AVC | 1. Include in bottom candidates the MV that combines with top-field motion to simplify to frame prediciton<br>2. Bias selection to favor frame prediction (compute SAD's, MAD for bottom field)<br>3. Choose best mode<br>4. Optional: Refine field/frame MV |
| No good MV from AVC | Good MV from AVC | 1. Include in top candidates the MV that combines with bottom-field motion to simplify to frame prediciton<br>2. Bias selection to favor frame prediction (compute SAD's, MAD for top field)<br>3. Choose best mode<br>4. Optional: Refine field/frame MV |
| No good MV from AVC | No good MV from AVC | 1. Get best candidate for top field<br>2. Get best candidate for bottom field<br>3. Consider additional bottom field candidate that combines with best top-field candidate to simplify to frame prediction<br>4. Consider additional top field candidate that combines with best bottom-field candidate to simplify to frame prediction<br>5. Bias selection to favor frame prediction (compute SAD's, MAD for both fields)<br>6. Choose best mode<br>7. Optional: Refine field/frame MV |

Table 9

Fig. 26

| B Frames | | |
|---|---|---|
| Top Field | Bottom Field | Action |
| Bypassed | Bypassed | 1. See if field MV's simplify to frame |
| Bypassed | Not bypassed | 1. Include in bottom candidates the MV(s) that combines with top-field motion to simplify to frame prediciton<br><br>2. Bias selection to favor frame prediction (compute SAD's for bottom field)<br><br>3. Choose best mode |
| Not bypassed | Bypassed | 1. Include in top candidates the MV(s) that combines with bottom-field motion to simplify to frame prediciton<br><br>2. Bias selection to favor frame prediction (compute SAD's for top field)<br><br>3. Choose best mode |
| Not bypassed | Not bypassed | 1. If both top and bottom fields have both forward and backward candidates, and the candidates are all good, then:<br>  a. See if bi-direction field MV's simplify to frame<br>  b. Optional: Refine field/frame MV's<br>  c. Go to END<br><br>2. If both top and bottom fields have forward candidates, and the candidates are both good, then:<br>  a. See if forward field MV's simplify to frame<br>  b. Optional: Refine field/frame MV's<br>  c. Go to END<br><br>3. If both top and bottom fields have backward candidates are both good, then:<br>  a. See if backward field MV's simplify to frame<br>  b. Optional: Refine field/frame MV's<br>  c. Go to END<br><br>4. For each direction, find field/frame candidates as we did for P frames (consider whether top/bottom field has good MV from AVC for this direction, bias selection of frame prediction, etc.)<br><br>5. If both directions allow frame prediction, use bi-direction frame prediction. If only one direction allows frame prediction, use frame prediction for just that one direction. If no direction allows frame prediction, use field prediction (or intra, if no good MV was found)<br><br>6. END |

Table 10

Fig. 27

SYSTEM FOR AND METHOD OF TRANSCODING VIDEO SEQUENCES FROM A FIRST FORMAT TO A SECOND FORMAT

FIELD OF THE INVENTION

This invention relates to transcoding. More specifically, this invention relates to efficiently transcoding video from a first video format to a second video format.

BACKGROUND

Advances in video technology have allowed users to view video data on an ever increasing number of devices and platforms. The desire to view video data on small platforms and the need to decrease the bandwidth for transmitting video data has lead to the development of different encoding formats that, among other things, substantially compress the video data. Video data can now be transmitted to and stored on mobile telephones and other small platforms; and extended-length movies can now be stored on lower-density video discs.

Many of these different video formats are not directly compatible. For example, video data encoded in the Advanced Video Coding ("AVC") format cannot be directly played on a video player configured for playing video in the Moving Picture Experts Group 2 (MPEG-2) format. Some prior art systems use transcoders to (1) translate the video data encoded in the AVC format ("AVC video data") into raw pixel data and then (2) translate the entire raw pixel data into video data encoded in the MPEG-2 format ("MPEG-2 video data"). Using the prior art systems, video data encoded in one format can be later played on a system configured to play video data in another format.

FIG. 1 shows one such prior art system 100. The system 100 includes an AVC decoder 105 coupled to an MPEG-2 encoder 110 over a channel 115. The AVC decoder 105 translates AVC video data into raw pixel data, which is transmitted over the channel 115 to the MPEG-2 encoder 110. The MPEG-2 encoder 110 then translates the raw pixel data into MPEG-2 video data, which can then be played on an MPEG-2 compatible device.

The solution provided by the system 100 has several disadvantages. First, the process performed by the system 100 is time consuming: it requires that the AVC video data be entirely translated into raw pixel data, resulting in a large block of raw pixel data that must all be translated into MPEG-2 video data. Second, the process requires a lot of memory: it must store much of the raw pixel data while, for example, predictive frames are generated.

SUMMARY OF THE INVENTION

Embodiments of the present invention are directed to systems for and methods of transcoding compressed video sequences from the Advanced Video Coding (AVC) format to the Moving Picture Experts Group 2 (MPEG-2) format. In accordance with embodiments of the present invention, transcoding is simplified by disabling or bypassing selected portions of the transcoding process. In one embodiment, AVC sequences to be considered for transcoding have a prediction structure similar to that of the MPEG-2 standard. One system in accordance with the present invention disables the AVC de-blocking filter on B-pictures, bypasses macroblock decoding in B-pictures, re-uses motion vectors during MPEG-2 encoding, or performs any combination of these steps. Combining these steps reduces the complexity of the operations during both AVC decoding and MPEG-2 encoding.

In a first aspect of the present invention, a method is used to transcode first video data in a first video format to second video data in a second video format. The method includes determining a prediction mode for a portion of the second video data from a prediction mode of a corresponding portion of the first video data and translating first motion vectors for the first video data directly into second motion vectors for the second video data. Preferably, the first video format is MPEG-4 Part 10 format and the second video format is MPEG-2 format.

In one embodiment, the second motion vectors are set to substantially equal the first motion vectors when the prediction modes of the first and second video data differ by less than a predetermined threshold value.

In one embodiment, the method also includes bypassing decoding of portions of the first video data that includes only zero-valued pixel data. The first motion vectors are translated into the second motion vectors by estimating the second motion vectors from the first motion vectors. As one example, the second motion vectors are estimated from the first motion vectors by rounding the first motion vectors.

In one embodiment, the second motion vectors are set to a mean of the first motion vectors when motion variance across the first video data is below a predetermined threshold value and are set to a median of the first motion vectors when the motion variance across the first video data is above the predetermined threshold value.

In one embodiment, the method also includes generating a list of motion vectors for a first portion of the first video data from motion vectors from a remaining portion of the first video data and selecting from the list of motion vectors a motion vector having a smallest residual error.

Preferably, the method also includes disabling deblocking filtering on a portion of pictures that form the first video data. The portion of pictures are all B-pictures. In other embodiments, the first video data comprises B pictures, and not one of the B-pictures in the video data are used as reference pictures; and the first video data comprises reference pictures and all of the reference pictures that form the first video data are allowable according to the second video format.

In one embodiment, the method also includes directly transcoding a portion of the first video data into a portion of the second video data. Only non-zero portions of the first video data are transcoded into the portion of the second video data.

In a second aspect of the present invention, a system for transcoding first video data in a first format to second video data in a second format includes a decoder coupled to an encoder. The decoder is for selecting a prediction mode of the second video data from a prediction mode of the first video data and for translating first motion vectors from the first video data to second motion vectors for the second video data. The encoder is for generating the second video data from the first video data. Preferably, the first format is MPEG-4 Part 10 (AVC) and the second format is MPEG-2.

In one embodiment, the decoder is programmed, such as by using software or hardware, to bypass only portions of B-pictures in the first video data. A portion of a B-picture is bypassed when a measure of prediction residuals and motion vectors for the subset of the first video data and a measure of prediction residuals and motion vectors for the second video data differ by no more than a predetermined threshold value.

In another embodiment, the encoder is programmed to estimate the second motion vectors from the first motion vectors. The second motion vectors are estimated by rounding the first motion vectors. Alternatively, the second motion vectors correspond to a mean of the first motion vectors when motion variance across the first video data is below a predetermined threshold and the second motion vectors correspond to a median of the first motion vectors when the motion variance across the first video data is above the predetermined threshold. Preferably, the decoder is programmed never to bypass intra-coded pictures.

In one embodiment, the encoder is programmed to determine the second motion vectors by rounding the first motion vectors. In another embodiment, the encoder is configured to generate a list of motion vectors for a block of the first video data from motion vectors from other blocks of the first video data and to select from the list of motion vectors a motion vector having a smallest residual error.

Preferably, the decoder comprises a deblocking filter programmed to bypass B-pictures in the first video data.

In a third aspect of the present invention, a method is used to transcode first video data in a first format to second video data in a second format. The method includes measuring a degree of similarity between side information of the first video data and side information of the second video data, and generating the second video data from the first video data based on the measured degree of similarity. As used herein, "side information" refers to any information, such as motion vectors and prediction residuals, that taken in combination with one set of pixel data is used generate another set of pixel data.

Preferably, the side information includes motion vectors. Also, preferably, the method includes disabling a deblocking filter for the first video data and bypassing transcoding parts of the first video data into the second video data when the first video data included only zero-valued residual blocks. In one embodiment, the method also includes bypassing transcoding parts of the first video data that is in a B-picture. Parts of the decoding process (such as motion compensation and IDCT) and parts of the encoding process (such as motion estimation, motion compensation, DCT, and quantization) are bypassed.

In a fourth aspect of the present invention, a system for transcoding first video data in a first format to second video data in a second format includes means for selecting a prediction mode of the second video data from a prediction mode of the first video data and for translating first motion vectors from the first video data to second motion vectors for the second video data; and means for generating the second video data from the first video data, wherein the means for generating is coupled to the means for selecting. In one embodiment, the means for selecting is programmed to bypass macroblocks only in B-pictures in the first video data. The B-picture macroblocks are bypassed when a measure of prediction and motion vectors for the subset of the first video data and a measure of prediction and motion vectors for the second video data differ by no more than a predetermined threshold value.

In another embodiment, macroblocks in B-pictures are bypassed only if they contain only zero valued pixel data.

In one embodiment, the means for generating is programmed to estimate the second motion vectors from the first motion vectors. In another embodiment, the means for selecting is programmed never to bypass intra-coded pictures nor intra-coded macroblocks. In still another embodiment, the means for selecting is programmed to bypass portions of B-pictures in the first video data.

In a fifth aspect of the present invention, a decoder transcodes first video data in a first format to second video data in a second format. The decoder is programmed to select a prediction mode of the second video data from a prediction mode of the first video data and to translate first motion vectors from the first video data to second motion vectors for the second video data.

In one embodiment, the decoder is also programmed to bypass only portions of B-pictures in the first video data. The portions of the B-pictures are bypassed when a measure of prediction residuals and motion vectors for the subset of the first video data and a measure of prediction residuals and motion vectors for the second video data differ by no more than a predetermined threshold value.

In one embodiment, a bypassed portion of the B-pictures contains only macroblocks of all zero-valued pixel data.

In one embodiment, the second motion vectors correspond to a mean of the first motion vectors when motion variance across the first video data is below a predetermined threshold and the second motion vectors correspond to a median of the first motion vectors when the motion variance across the first video data is above the predetermined threshold.

In one embodiment, the decoder is further programmed never to bypass intra-coded pictures.

In a sixth aspect of the present invention, a method of transcoding Blu-ray AVC pictures to MPEG-2 pictures includes disabling de-blocking for B pictures contained in the Blu-ray AVC pictures, bypassing decoding of non-reference B-pictures within the Blu-ray AVC pictures and re-using motion information from the Blu-ray AVC pictures when setting motion vectors for the MPEG-2 pictures, and re-using prediction residuals for the bypassed non-reference B-pictures when setting prediction residuals for the MPEG-2 pictures. Preferably, decoding of a non-reference frame macroblock is bypassed when (a) the macroblock is not intracoded, (b) the macroblock is not a spatial predictor for an intracoded macroblock, (c) motion vectors for the macroblock have reference pictures that are valid MPEG-2 reference pictures, (d) if parts of the macroblock are bi-predicted, then the two predictions are from different directions, and (e) if the macroblock has motions different from 16×16, then the motions meet a similarity threshold and the prediction types for the entire macroblock are the same.

Alternatively, decoding of a non-reference field macroblock is bypassed when (a) the macroblock is not intracoded, (b) the macroblock is not a spatial predictor for an intracoded macroblock, (c) motion vectors for the macroblock have reference pictures that are valid MPEG-2 reference pictures, (d) if parts of the macroblock are bi-predicted, then the two predictions are from different directions, and (e) if the macroblock has motions different from 16×16 or 16×8, then the motions within an upper portion of a 16×8 region and a lower portion of the 16×8 region both meet a similarity threshold, the prediction types for the upper portion of the 16×8 region are the same, and the prediction types for the lower portion of the 16×8 region are the same.

In one embodiment, the method also includes determining a list of MPEG-2 motion vector candidates. Preferably, the list of motion vector candidates includes a mean of motion vectors from sub-blocks of the Blu-ray AVC pictures. Alternatively, the list of motion vector candidates includes a reverse motion vector, a concatenation motion vector, or a combination of both. In one embodiment, the method also includes translating field motion vectors to frame motion vectors.

In a seventh aspect of the present invention, a system for transcoding from Blu-ray AVC pictures to MPEG-2 pictures includes a Blu-ray decoder coupled to an MPEG-2 encoder. The Blu-ray decoder is programmed to disable de-blocking for B pictures contained in the Blu-ray AVC pictures and to bypass decoding portions of non-reference B-pictures within the Blu-ray AVC pictures. The MPEG-2 encoder is programmed to re-use motion information from the Blu-ray AVC pictures when setting motion vectors for the MPEG-2 pictures and to re-use prediction residuals for the bypassed portions of non-reference B-pictures when setting prediction residuals for the MPEG-2 pictures.

BRIEF DESCRIPTION OF THE DRAWINGS

FIG. 5 illustrates transcoding from AVC data to MPEG-2 field prediction for frame pictures, in accordance with the present invention.

FIGS. 12A-C show how operations are able to be eliminated from the transcoding process, in accordance with the present invention.

FIG. 13 shows how the number of separable transforms for transcoding from AVC to MPEG-2 is able to be reduced, in accordance with the present invention.

FIGS. 26 and 27 show tables used to determine when macroblock prediction is changed to frame for P and B frames, respectively, in accordance with embodiments of the present invention.

DETAILED DESCRIPTION OF A PREFERRED EMBODIMENT

In accordance with the present invention, video data in a first format are efficiently transcoded into video data in a second format by, among other things, determining which information in the first format is able to be reused in the second format. The information is then reused, saving processing time that would have been needed to transcode that information. In a preferred embodiment, the first video data is AVC (also referred to as MPEG-4 Part 10) video data and the second video data is MPEG-2 video data. Those skilled in the art, however, will appreciate that other video formats are also able to be used in accordance with the present invention.

Embodiments of the invention are able to be used with AVC sources that are compressed with either field pictures or frame pictures, including macroblock level adaptive field/frame ("MBAFF") coding for frame pictures. Because of its popularity, MPEG-2 frame pictures, for which prediction may be either field-based or frame-based, are discussed in detail below, though other picture types are also able to be used.

Figure 1:
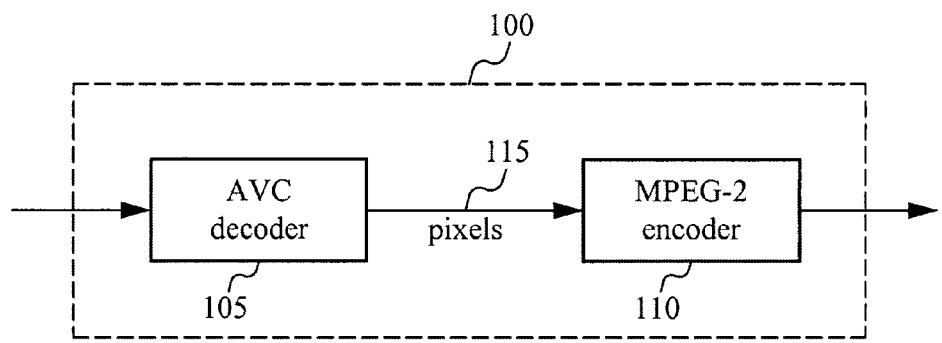
FIG. 1 is a high-level block diagram of a prior art transcoder.
Figure 2:
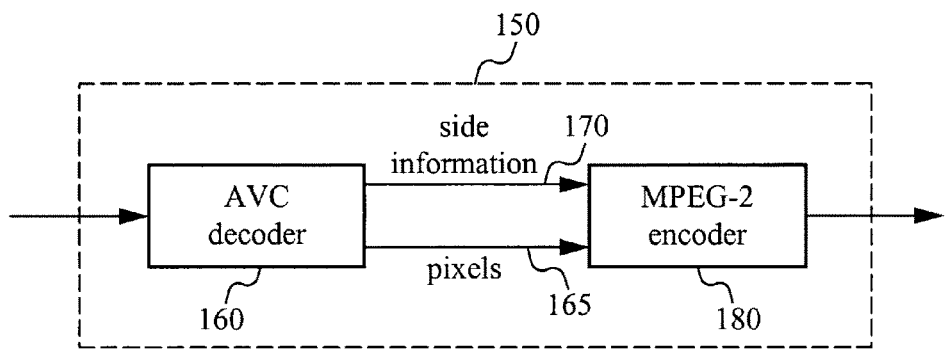
FIG. 2 is a high-level block diagram of a transcoder in accordance with one embodiment of the present invention.

FIG. 2 is a block diagram of a transcoder 150 in accordance with one embodiment of the present invention. The transcoder 150 includes an AVC decoder 160 coupled to an MPEG-2 encoder 180 over the channels 165 and 170. The channel 165 is for transmitting pixel data and the channel 170 is for transmitting side information, such as motion vectors, prediction residuals, and any other information used to reconstruct pixel data. The AVC decoder 160 takes AVC encoded data and generates the raw pixel data and the side information. The amount of raw pixel data generated by the AVC decoder 160 is generally much smaller than the amount of raw pixel data generated by the AVC decoder 105 in FIG. 1. The MPEG-2 encoder 180, using the side information, is able to generate the MPEG-2 video data more quickly and efficiently than the MPEG-2 encoder 110 in FIG. 1.

Figure 3:
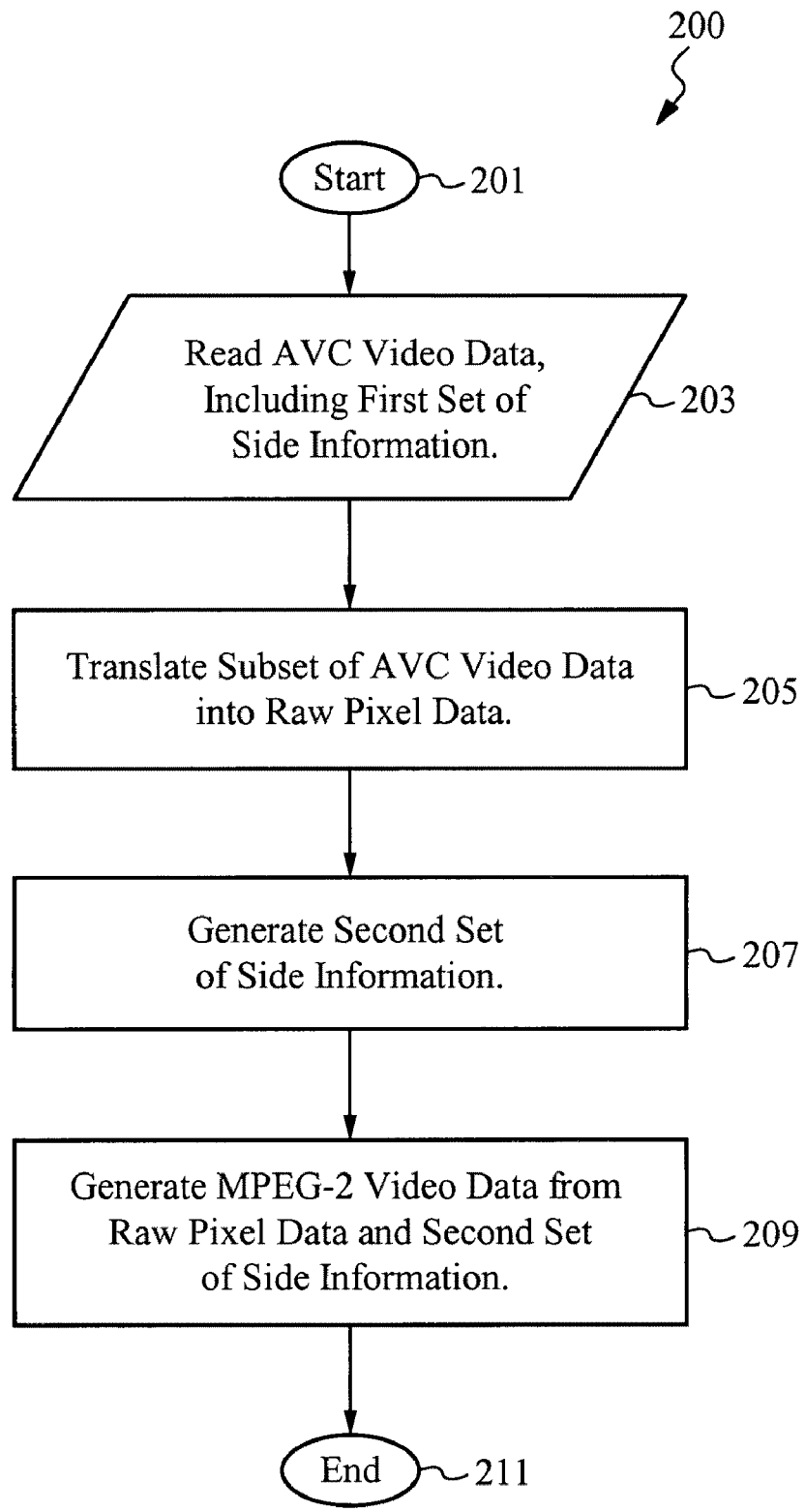
FIG. 3 shows the steps of a method for transcoding AVC video data in accordance with the present invention.

FIG. 3 shows the steps of a process performed by the transcoder 150 of FIG. 2. Referring to both FIGS. 2 and 3, the process starts in a start step 201, which may include, for example, initializing any data structures used by the AVC decoder 160. Next, in the step 203, the AVC decoder 160 receives the AVC video data, which includes side information in the form of compression parameters. Next, in the step 205, a portion of the AVC video data is translated to recover raw pixel data. It will be appreciated that the less raw pixel data that is recovered in the step 205, that must ultimately be reencoded into MPEG-2 video data, the faster the entire process will be. Next, in the step 207, a second set of side information is generated by the AVC decoder 160, used later to encode the MPEG-2 video data. As explained below, this second side information is determined by a function of the first side information. Next, in the step 209, the pixel data and the second set of side information is used by the MPEG-2 encoder 180 to generate the MPEG-2 video data. The process ends in the step 211.

The generated MPEG-2 video data can, among other things, now be played on an MPEG-2 compatible video player, stored on a video disc for later playback on an MPEG-2 compatible video player, or streamed to a device on which it can be stored or played.

I. Limits of the Range of AVC Options

AVC's full range of coding options allows a sequence to be compressed in a very different manner than would be allowed in the MPEG-2 standard. One embodiment, which makes the problem of transcoding from AVC to MPEG-2 more tractable, limits the range of AVC options that are permissible for an AVC sequence to be transcoded to MPEG-2.

Figure 4:
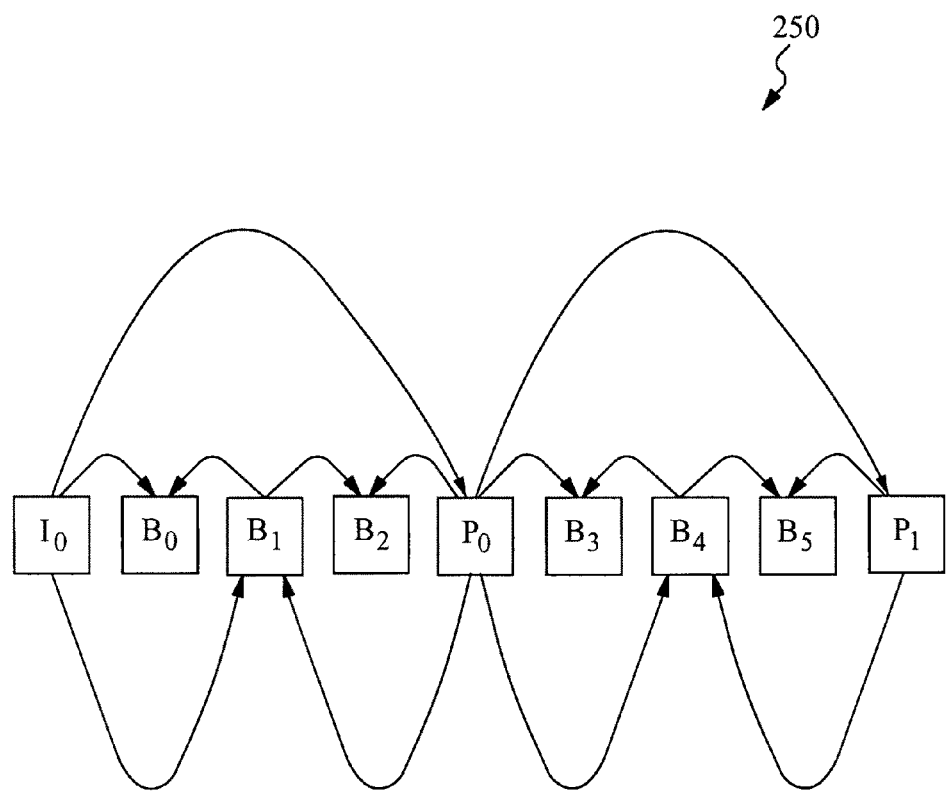
FIG. 4 is a diagram showing the relationship between I-pictures, B-pictures, and P-pictures in accordance with the present invention.

FIG. 4 shows a sequence of frames used to discuss one embodiment of the present invention. Referring to FIG. 4, an arrow from a first frame to a second frame indicates that the first frame is used to predict the second frame. Still referring to FIG. 4, the range of AVC options in accordance with one embodiment are limited as follows:

1. B-pictures are not used as reference pictures. Thus in a sequence of frames (in display order) of $I_0B_0B_1B_2P_0B_3B_4B_5P_1$, the P-frames are predicted only from P- and I-frames, and the B-frames also are predicted only from P- and I-frames. Although not discussed in detail, this restriction is able to be relaxed with minor modifications to embodiments of the present invention. For example, if $B_1$ is predicted from $I_0$ and $P_0$, and $B_1$ is subsequently used as a reference frame for $B_0$ and $B_2$, then the discussion below is still be applicable for $B_0$ and $B_2$.
2. Reference pictures are restricted to be the same as those allowable in MPEG-2. For example, only a single reference frame is used for P frames, and the two bi-prediction reference frames for B frames. For reference fields, a P picture uses as reference the two most recently decoded P or I fields, and a B picture uses as reference the fields from the two most recently decoded P or I frames.

In accordance with these limits, the example I/P/B pattern is not allowable in MPEG-2, but may be permissible for transcoding in accordance with the present invention. The example shown in FIG. 4 is allowable according to Blu-ray AVC, as described below.

In a preferred method of the present invention, the AVC deblocking filter is disabled on B-pictures, thereby reducing the complexity during transcoding. When these B-pictures are not used as reference pictures, the error incurred by disabling the filter does not propagate to subsequent pictures, thus localizing the error to a single picture and minimizing its impact on the overall sequence quality. For the example given in FIG. 4 (where $B_0$ and $B_2$ are predicted from $B_1$), disabling the de-blocking filter on $B_0$ and $B_2$ prevents propagation to other frames; furthermore, if the de-blocking is disabled for $B_1$, propagation of errors is still temporally localized to the three-frame group of $B_0B_1B_2$, which may also be acceptable.

Beyond disabling the de-blocking filter on B-pictures, embodiments of the invention use two related methods to reduce the complexity of transcoding: At the AVC decoder, macroblock decoding is bypassed (when feasible), so that information is directly transferred to the MPEG-2 encoder in the compressed domain; and at the MPEG-2 encoder, AVC motion information is reused, while the compressed-domain information is accepted from the AVC decoder.

Below, Section II discusses details related to the AVC decoder, and Section III discusses details related to the MPEG-2 encoder. Section IV discusses the transformation that bridges the transform domains of the two standards—the conversion from the AVC 4×4 transform domain to the DCT 8×8 transform domain. Section V compares the transcoder with a cascaded transcoder, both in terms of complexity reduction and in terms of Peak Signal-to-Noise Ratio (PSNR) of the resulting MPEG-2 video.

II. AVC Decoder

By re-using the motion vectors and prediction residual of a macroblock when encoding to MPEG-2, motion compensation and inverse transformation is able to be avoided at the AVC decoder, thereby reducing complexity. Re-using the prediction residual introduces additional error, because the predictions at the AVC decoder and at the MPEG-2 encoder will be different. However, if these bypassed macroblocks are not subsequently used for prediction in MPEG-2, there will be no temporal propagation and accumulation of these errors. Hence, in a preferred embodiment, only the decoding for macroblocks in B pictures is bypassed.

If the AVC decoder bypasses pixel decoding of some macroblocks, the decoder will not be able to use those macroblocks to form predictions for other macroblocks. In terms of temporal prediction, this is not a problem provided that the B pictures whose macroblocks are bypassed are not used as references (as required in the list of restrictions in Section I). However, it is highly likely that within B pictures there will be intra-coded macroblocks that require spatial predictions from neighboring macroblocks. These intra-coded macroblocks cannot be bypassed, because their prediction structure is so different from that of MPEG-2 as to make a compressed-domain conversion intractable. When such intra-coded macroblocks occur, the AVC decoder must go decode any macroblocks whose pixels are required as predictions for the intra macroblocks. Thus, during decoding, some inter-coded macroblocks are forced to be decoded in order to serve as spatial predictions for intra-coded macroblocks.

Directly using a macroblock's AVC prediction residual for MPEG-2 is only meaningful if the predictions are formed in very similar manners. An MPEG-2 macroblock with frame prediction has its 16×16 pixels predicted with forward, backward, or bi-directional prediction, where one motion vector is allowed for each temporal direction of prediction. An MPEG-2 macroblock with field prediction has its two 16×8 fields both predicted with forward, backward, or bi-directional prediction, with one motion vector allowed for each field for each temporal direction of prediction.

The AVC standard is considerably more flexible, allowing macroblocks to have separate motions for sub-blocks of various shapes, and to have those sub-blocks have different directions of temporal prediction (for example, some forward, some backward, some bi-directional). For field coding in AVC, each field is coded separately in a 16×16 macroblock. FIG. 5 shows the relationship between AVC field macroblocks and MPEG-2 frame macroblocks. When the prediction structure for AVC is significantly different from the structures allowed by MPEG-2, the macroblock pixel predictions are in turn very different, and hence the prediction residual available in AVC does not match very closely the residual needed by MPEG-2.

As shown in FIG. 5, two AVC macroblocks 360 are transcoded into two MPEG-2 macroblocks 390, which uses field prediction for frame pictures. The AVC macroblocks 360 contain a 16×16 top field macroblock 350 and a 16×16 bottom field macroblock 355. The top field macroblock 350 is split into two 16×8 blocks 350A and 350B, and the bottom field macroblock 355 is split into two 16×8 blocks 355A and 355B. The MPEG-2 macroblocks 390 are located in sequential macroblock rows $2i$ and $2i+1$. The macroblock in row 21 contains a top field 370A, and a bottom field 370B. The macroblock in row $2i+1$ contains a top field 375A, and a bottom field 375B.

The 16×8 block 350A is transcoded into the 16×8 block 370A, the 16×8 block 350B is transcoded into the 16×8 block 375A, the 16×8 block 355A is transcoded into the 16×8 block 370B, and the 16×8 block 355B is transcoded into the 16×8 block 375B. The top field 350 and the bottom field 355 may be from an MBAFF pair (in a frame picture) or from separate field pictures.

To prevent residual mismatch between AVC and MPEG-2, in one embodiment decoding bypassed only for AVC macroblocks having prediction similar to prediction allowed by MPEG-2. Subsection II.A below describes how to measure the similarity between observed AVC predictions and predictions allowable by MPEG-2. Subsection II.B then describes how to use the similarity measure, along with motion analysis, to ensure residual compatibility when bypassing AVC decoding.

II.A. Prediction Structure Analysis

In one embodiment, to determine whether or not decoding of a macroblock is able to be bypassed, the predication structure must first be examined. In particular, a measure of dissimilarity between the observed AVC prediction structure and the possible MPEG-2 prediction structures is computed. Note that even if a macroblock does not have its decoding bypassed, a method of prediction for MPEG-2 must still be chosen; thus the dissimilarity measure can be useful both for deciding whether or not to bypass an AVC macroblock's decoding, and for choosing the prediction type in general.

Figures 6A, 6B, 6C:
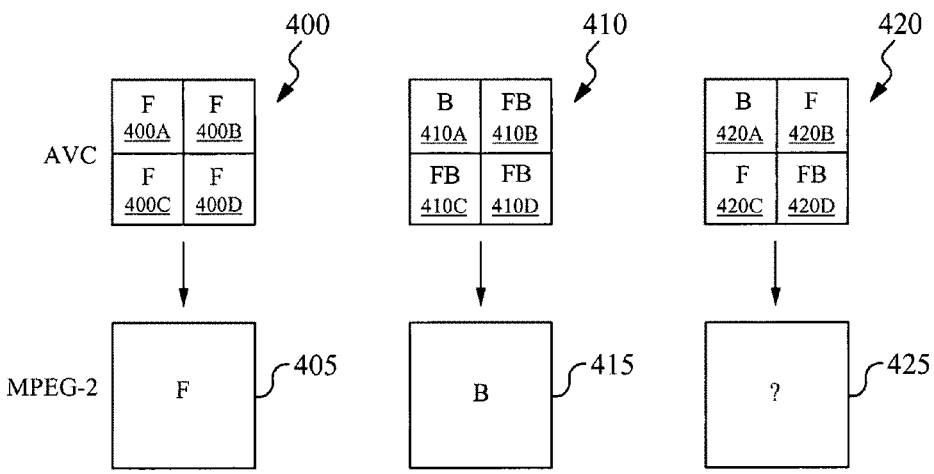
FIGS. 6A-C show transcoding examples, each illustrating transcoding multiple AVC macroblocks to one MPEG-2 macroblock using field prediction for frame pictures, in accordance with the present invention.

FIGS. 6A-C show three hypothetical prediction structures from a frame prediction structure in AVC to an MPEG-2 prediction structure. In FIG. 6A, the AVC macroblock 400 contains the blocks 400A-D and is transcoded into the MPEG-2 macroblock 405. In FIGS. 6A-C, as in all the examples in this application, "F" indicates forward prediction, "B" indicates backward prediction, and "FB" indicates bi-directional (e.g., forward and backward) prediction.

In FIG. 6B, the AVC macroblock 410 contains the blocks 410A-D and is transcoded into the MPEG-2 macroblock 415. And in FIG. 6C, the AVC macroblock 420 contains the blocks 420A-D and is transcoded into the MPEG-2 macroblock 425. Although each of the FIGS. 6A-C shows four 8×8 blocks that form a single 16×16 AVC macroblock, this does not necessarily mean that the AVC macroblock had those four 8×8 blocks coded separately. Each of the FIGS. 6A-C shows 8×8 blocks because that is the smallest size for which AVC allows the prediction type and prediction reference frame to change.

In FIG. 6A, all four of the 8×8 AVC blocks 400A-C were forward predicted, and accordingly it is determined that the 16×16 MPEG-2 macroblock 405 should also be forward predicted. In FIG. 6B, three of the four 8×8 blocks (blocks 410B-D) are bi-directionally predicted, while the fourth 410A is only backward predicted. In accordance with the invention, the prediction schemes for the MPEG-2 macroblock (e.g., 415) are able to be derived from the prediction schemes of the AVC frame (e.g., 410) in different ways: In one embodiment, the MPEG-2 macroblock 415 is also be bi-directionally predicted. In an alternative embodiment, it may be determined that the block 410A has no forward prediction because there is no good motion match from the forward direction, and forcing the whole macroblock 415 to be bi-predicted may introduce artifacts in that corner. In this alternative embodiment, it may be determined that since all four 8×8 blocks 410A-D have a backward component, the safest prediction is backward only as shown in FIG. 6B.

In FIG. 6C, the block 420A is backward predicted, the blocks 420B and 420C are forward predicted, and the block 420D is bi-predicted. In one embodiment, because three-fourths of the 8×8 blocks (420B-D) have a forward component (while only half have a backward component), the MPEG-2 macroblock 425 is forward predicted. It will be appreciated that other criteria (e.g., voting schemes) are able to be used to determine the prediction type of an MPEG-2 frame macroblock from the prediction types of an AVC frame macroblock.

The following algorithm automates the prediction selection for MPEG-2 based on the AVC prediction types, for frame data. First, the following quantities, which measure how much each prediction type for MPEG-2 is lacking relative to the observed prediction types in AVC, are defined in Equation (1):

$S_{F,1}$=4−(Number of 8×8 blocks that have forward prediction)

$S_{B,1}$=4−(Number of 8×8 blocks that have backward prediction)

$S_{FB,1}$=4−(Number of 8×8 blocks that are bi-predicted)  (1)

For the example shown in FIG. 6B, e.g., in order to have forward prediction in MPEG-2, forward prediction in one 8×8 block (410A) is missing. Next, the following quantities that measure how much prediction information would be discarded by MPEG-2 relative to the observed prediction types in AVC are defined in Equation (2):

$S_{F,2}$=Number of 8×8 blocks that are backward predicted $S_{B,2}$=Number of 8×8 blocks that are forward predicted  (2)

For the example shown in FIG. 6B, $S_{B,2}$=3, e.g., in order to have only backward prediction in MPEG-2, forward prediction for three 8×8 blocks (410B-D) would be discarded. Finally, dissimilarity measures are able to be defined by forming weighted sums of the values above, as shown in Equation (3):

$D_F = \alpha S_{F,1} + \beta S_{F,2}$ $D_B = \alpha S_{B,1} + \beta S_{B,2}$ $D_{FB} = \alpha S_{FB,1}$  (3)

Using the algorithm shown in Table 1, the measure of minimum dissimilarity can then determine the type of MPEG-2 prediction to use:

TABLE 1

$D_{min} = \text{MIN}(D_F, D_B, D_{FB})$;
if ($D_{min} == D_F$)
    choose forward prediction;
else if ($D_{min} == D_B$)
    choose backward prediction;
else
    choose bi-prediction In the case of ties in evaluation of the minimum, the prediction type that has the smoothest motion field is able to be selected. Those skilled in the art will recognize other criteria for selecting the prediction type in case of ties.

Note that different choices of the weights α and β will give quite different results. Accordingly, the weights α and β should be chosen based on the expected consequences of using a prediction type not present in AVC (for α), or having to discard prediction information present in AVC (for β).

Figures 7A, 7B, 7C:
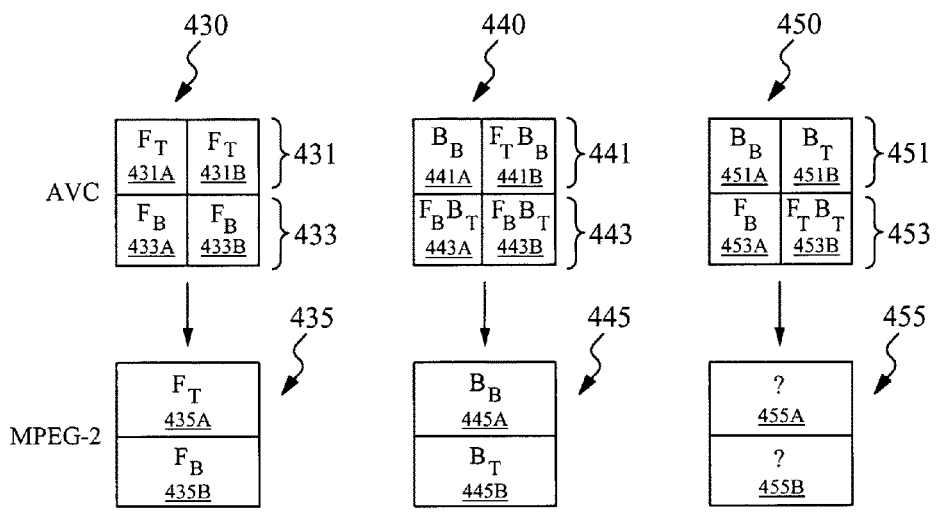
FIGS. 7A-C show transcoding examples, each illustrating transcoding multiple AVC macroblocks to multiple MPEG-2 macroblocks using field prediction, in accordance with the present invention.

The case for field prediction is slightly more complicated than for frame prediction, as FIGS. 7A-C demonstrate. The labels "F", "B", and "FB" have been described above. The subscript "T" indicates prediction is from the top reference field, and the subscript "B" indicates prediction is from the bottom reference field. The label $F_T$ indicates that a macroblock is forward predicted from a top reference field, and the label $F_B$ indicates that a macroblock is forward predicted from a bottom reference field.

The AVC data are shown after rearrangement for MPEG-2, as was shown in the macroblocks 390 of FIG. 5. FIG. 7A shows AVC data 430 including a top field 431 and a bottom field 433. The top field 431 contains blocks 431A and 431B, and the bottom field 433 contains blocks 433A and 433B. The corresponding MPEG-2 data 435 contains a top field 435A and a bottom field 435B.

FIG. 7A shows an exact match between AVC and MPEG-2—the top field 435A is forward predicted from the top reference field (as was the top field 431 for AVC), and the bottom field 435B is forward predicted from the bottom reference field (as was the bottom field 433 for AVC). As was the case for the example of FIGS. 6B-C, the examples in 7B and 7C are less obvious.

In FIG. 7B, the AVC data 440 includes one block 441A that is backward predicted from a bottom reference field, one block 441B that is forward predicted from a top reference field and also backward predicted from a bottom reference field, and two blocks 443A and 443B that are forward predicted from a bottom reference field and also backward predicted from a top reference field. The transcoded MPEG-2 data 445 includes a block 445A that is backward predicted from a bottom reference field and a block 445B that is backward predicted from a top reference field. It will be appreciated that FIG. 7B describes only one possible outcome of the algorithm.

In FIG. 7C, the AVC data 450 includes a block 451A that is backward predicted from a bottom reference field, a block 451B that is backward predicted from a top reference field, a block 453A that is forward predicted from a bottom reference field, and a block 453B that is forward predicted from a top reference field and also backward predicted from a top reference field. The transcoded MPEG-2 data 455 has a top field 455A and a bottom field 455B whose predicted types are able to be determined using an analysis similar to that used in FIG. 6C.

The algorithm for frame prediction in Table 1, above, is able to be modified to make it appropriate for field prediction. The case where data for both fields are available for analysis, i.e. after having received macroblock data for both fields, is considered first. The quantities calculated in Equation (4) are used in this analysis:

$S_{F,2}$=Number of 8×8 blocks that are backward predicted $S_{B,2}$=Number of 8×8 blocks that are forward predicted (4)

$S_{F,1}$=4−(Number of 8×8 blocks that have forward prediction)

$S_{B,1}$=4−(Number of 8×8 blocks that have backward prediction)

$S_{FB,1}$=4−(Number of 8×8 blocks that are bi-predicted) (5)

For the example shown in FIG. 7C, $S_{B,1}$=1, and $S_{B,2}$=2. The following additional quantities, calculated in Equation (6), measure differences in the parities of the reference fields for each of the fields to be encoded:

$$S_{F,3} = \begin{cases} 1 & \text{if both } 8 \times 8 \text{ blocks of top field have forward} \\ & \text{prediction and the parities of reference fields differ} \\ 0 & \text{otherwise} \end{cases} \quad (6)$$

$$S_{B,3} = \begin{cases} 1 & \text{if both } 8 \times 8 \text{ blocks of top field have backward} \\ & \text{prediction and the parities of reference fields differ} \\ 0 & \text{otherwise} \end{cases}$$

$$S_{F,4} = \begin{cases} 1 & \text{if both } 8 \times 8 \text{ blocks of bottom field have forward} \\ & \text{prediction and the parities of reference fields differ} \\ 0 & \text{otherwise} \end{cases}$$

$$S_{B,4} =$$
$$\begin{cases} 1 & \text{if both } 8 \times 8 \text{ blocks of bottom field have backward} \\ & \text{prediction and the parities of reference fields differ} \\ 0 & \text{otherwise} \end{cases}$$

For the example shown in FIG. 7C, $S_{F,3}$=0, $S_{F,4}$=1, $S_{B,3}$=1, and $S_{B,4}$=0. As before, dissimilarity measures are able to be calculated in accordance with Equation (7), using weighted sums of the values above:

$D_F = \alpha S_{F,1} + \beta S_{F,2} + \eta(S_{F,3} + S_{F,4})$ $D_B = \alpha S_{B,1} + \beta S_{B,2} + \eta(S_{B,3} + S_{B,4})$ $D_{FB} = \alpha S_{FB,1} + \eta(S_{F,3} + S_{F,4} + S_{B,3} + S_{B,4})$ (7)

Using the algorithm in Table 2, the minimum dissimilarity is then used to determine the type of MPEG-2 prediction to use:

TABLE 2

$D_{min}$ = MIN($D_F$, $D_B$, $D_{FB}$);
if ($D_{min}$ == $D_F$)
    choose forward prediction;
else if ($D_{min}$ == $D_B$)
    choose backward prediction;
else
    choose bi-prediction;

Actual parities for the reference fields for MPEG-2 are able to then be chosen by another manner, for example by simple majority, by uniformity of AVC motion, or by other means.

The additional weighting factor η in Equation (7) controls how much to penalize differences in the parities of the reference fields between AVC and MPEG-2.

If the AVC data is coded in separate field pictures, then decisions may have to be made (for example, whether or not to bypass decoding of a field macroblock) without information for both fields. In such a case, the dissimilarity measures in Equation (7) are able to be modified so that they only consider the dissimilarity for the single field under consideration. When the first of two fields is observed, the prediction structure is analyzed for that single field in isolation. Later when the second field is observed, the dissimilarity measure includes the results of the analysis of the first field; it is likely that decisions about the second field will be constrained by decisions already made due to analysis of the first field.

Figure 8:
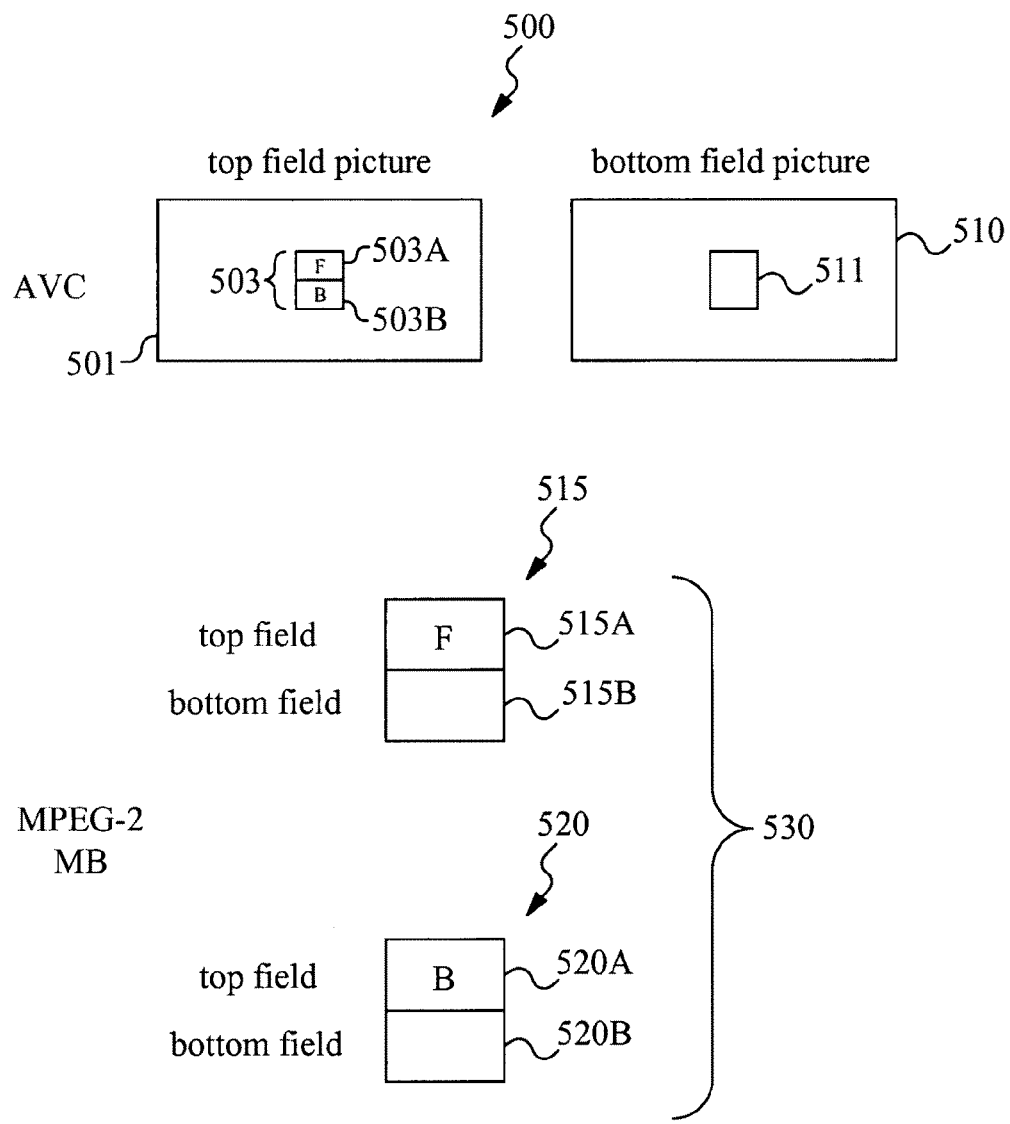
FIG. 8 shows macroblocks for two AVC pictures, and how the macroblocks are transcoded to an MPEG-2 frame picture, in accordance with the present invention.

This situation is illustrated in FIG. 8, which shows an AVC frame 500 and a corresponding transcoded pair of MPEG-2 macroblocks 530. The AVC frame 500 contains a top field picture 501 and a bottom field picture 510. The top field picture 501 contains a forward predicted 16×8 block 503A and a backward predicted 16×8 block 503B (collectively, the block 503), and the bottom field picture 510 contains an AVC macroblock 511. The pair of MPEG-2 macroblocks 530 contain the MPEG-2 macroblocks 515 and 520. The upper macroblock 515 contains a top field 515A and a bottom field 515B, and the lower macroblock 520 contains a top field 520A and a bottom field 520B. The top field 515A comes from the block 503A, the top field 520A comes from the block 503B, and the fields 515B and 520B collectively come from the macroblock 511.

If a transcoder in accordance with the present invention chooses to bypass decoding the AVC macroblock 503, then when the co-located macroblock 511 arrives, the transcoder will need to make sure that the MPEG-2 predictions for the bottom field 515B and 520B are compatible with those of the top field 515A and 520A. For the example shown in FIG. 8, when the transcoder gets to the co-located macroblock 511, the only feasible prediction types (according to MPEG-2 requirements, and the decisions already made concerning the top field for these macroblocks) are forward prediction for the bottom field 515B of the upper macroblock 515, and backward prediction for the bottom field 520B of the lower macroblock 520.

II.B. Motion Analysis

It is not enough to consider the prediction structure, as discussed in subsection II.A, to ensure that an AVC macroblock has its decoding safely bypassed. In addition to having similar prediction structure in terms of forward, backward or bi-prediction, the motion vectors must also be similar. The algorithm presented in Table 3 below uses prediction similarity and motion uniformity.

For MPEG-2's field prediction in frame pictures, each 16×16 macroblock contains two 16×8 fields, which are treated separately. For whichever AVC field is received first, the decision to bypass the AVC decoding is based only on that field's data. Since both fields in an MPEG-2 macroblock need to have the same prediction structure (both forward, both backward, or both bi-directional), when the second field is received it is only bypassed if its prediction structure matches that of the first field.

Table 3 contains pseudo-code to describe a process for deciding whether or not to bypass the decoding of an AVC macroblock in a B field picture in accordance with one embodiment of the present invention. The input first_field_flag is TRUE if the first field of a frame is currently being processed; otherwise it is FALSE. If first_field_flag is FALSE and if the co-located macroblock in the other field was bypassed, then the input first_field_was_bypassed is TRUE; otherwise it is FALSE. If the output do_decode of the pseudo-code is FALSE, then it is determined to bypass the decoding of the AVC macroblock; otherwise, it is decoded as normal.

TABLE 3

Inputs: first_field_flag, first_field_was_bypassed
Output: do_decode, MPEG-2 motion vector(s)

```
 1    do_decode = FALSE ;
 2    mb_half = top 16×8 half of current AVC field MB ;
 3    if ( (first_field_flag==TRUE) ||
 4         ((first_field_flag==FALSE) && (first_field_was_bypassed==FALSE)))
 5    {
 6        compute D_min for this single field only ;
 7        if (D_min > T_d)
 8        {
 9            /* dissimilarity too high */
10            goto 32 ; /* "do_decode=TRUE, compute median" */
11        }
12    } else
13    {
14        /* (first_field_flag==FALSE) && (first_field_was_bypassed==TRUE) */
15
16        compute D_min using this field along with results from previous field;
17        if (D_min > T_d)
18        {
19            /* dissimilarity too high */
20            goto 32 ; /* "do_decode=TRUE, compute median" */
21        }
22    }
23
24    compute μ=mean of the motion vectors in mb_half for prediction type
25        that gave D_min, weighted according to size of sub-block ;
26    compute σ²=variance of motion vectors used to compute μ;
27
28    if ( σ²<T_1)
29        use μ for motion vector for this field in MPEG-2 macroblock ;
30    else
31    {
32        do_decode=TRUE ;
33        compute λ=median of motion vectors in mb_half for prediction type
34            that gave D_min, weighted according to size of sub-block ;
35        use λ for motion vector for this field in MPEG-2 macroblock ;
36    }
37
38    if (mb_half == top 16×8 half of current AVC field MB)
39    {
40        mb_half = bottom 16×8 half of current AVC field MB ;
41        goto 3 ;
42    }
```

Referring to Table 3, $T_d$ is a threshold of acceptable dissimilarity between AVC and MPEG-2 prediction structures, and $T_1$ is a threshold for motion vector uniformity. It will be appreciated that comments between the delimiters (/* and */), in Table 3 and throughout this application, are included merely to improve readability of the pseudo code.

For AVC frame data, the algorithm in Table 3 is easily simplified because all the frame data for an MPEG-2 macroblock is available from a single AVC macroblock.

In the algorithm of Table 3, motion vectors are only estimated with the mean when the motion across the region is relatively uniform (according to $\sigma^2$ and $T_1$) and when the prediction structures are similar (according to $D_{min}$ and $T_d$). When one of these criteria is not met, the median estimator is used. Using the mean for relatively uniform regions yields a motion vector estimate that is more accurate than the median. Using the median for regions of non-uniform motion provides robustness to large deviations not possible with the mean.

One scenario is possible with the algorithm of Table 3 that requires special attention, which is most easily described by way of example: As one example, it is assumed that a macroblock in the first field is bypassed, but the co-located macroblock in the second field is intra. The intra macroblock has no motion information, and as described previously it must be decoded. However, from the MPEG-2 encoder's point of view, encoding the macroblock is not possible—it has all the information required to code the bypassed field, but since the two fields of a macroblock must both have the same prediction type (both forward, both backward, or both bi-predicted), there is no way to code the second field.

At this point, the MPEG-2 encoder will have two options: (1) Do a motion estimation for the field that was intra coded, in order to find a motion vector or vectors compatible with the bypassed field; or (2) Since the MPEG-2 encoder has all the information relevant to the bypassed field (motion vector, residual data), it is able to perform its own approximation to an AVC decode; once the pixels are obtained, the MPEG-2 encoder is able to encode the macroblock in whichever way is most convenient for it.

Note that if the MPEG-2 encoder chooses option (2), it is equivalent to decoding the bypassed macroblock at the AVC decoder; however, the MPEG-2 encoder may choose to use motion compensation as defined in MPEG-2, which is less computationally demanding than the motion compensation defined by AVC. Hence, even in this scenario, some complexity reduction can be attained. Other scenarios are possible where no compatible MPEG-2 motion is able to be derived from the AVC motion; such cases are similar to the previous case discussed in the scenario above, requiring the MPEG-2 encoder to perform extra processing.

II.C. Motion Analysis for P-Pictures

In a preferred embodiment of the invention, macroblock decoding in P pictures is not bypassed. However, motion should still be analyzed so that motion estimation is able to be eliminated (or at least simplified) at the MPEG-2 encoder.

Motion analysis for P pictures is very similar to that of B pictures. The top 16×8 and bottom 16×8 regions of an AVC field macroblock are treated separately, since they correspond to one field of two separate 16×16 MPEG-2 frame macroblocks. The motion vectors are able to be estimated with the mean of the AVC motions (or the median, if the variance is too large), as was done for B pictures; alternatively, the motion vectors are directly estimated with the median.

In AVC field pictures, the second field of a frame may reference the first field of the frame. However, predicting one field of a frame from the other field in the same frame with MPEG-2's field prediction for frame pictures is not possible. Therefore, when a block takes its prediction from the field of opposite parity within a frame, the observed motion and the motion present in the field of opposite parity are able to be concatenated. For example, if a motion vector in the top field of a frame points to a position shifted by n in the bottom field, then the motion that was present in the bottom field at that shifted position is able to be found; by adding the two motions, the motion vector between the top field and whichever reference field was used by the shifted block in the bottom field is able to be found. If no motion is available at the shifted position (for example, that macroblock was intra coded), then no motion vector is computed.

III. MPEG-2 Encoder

The MPEG-2 encoder uses the same frame types (I, P, or B) as were used in the AVC stream. If an AVC frame consists of an I field and a P field (where the P field was predicted from the I field), the MPEG-2 encoder will use an I frame.

For individual macroblocks, the MPEG-2 encoder uses whatever prediction type (forward, backward, or bi-directional) is provided from analysis at the AVC decoder. For blocks whose AVC decoding was bypassed, the motion vectors must be used without modification. Since the motion vector precision is quarter-pel in AVC and half-pel in MPEG-2, the AVC motion vectors must be rounded down to lower precision. Rounding all non-integer motion vectors to the nearest half-pixel location (i.e. motions with ¼, ½, and ¾ components get rounded to ½, and integer motions remain integers) ensures that the spatial smoothing due to fractional motions in AVC is retained in MPEG-2, and leads to small but consistent Peak Signal-to-Noise Ratio (PSNR) improvements relative to a simpler rounding involving a right-shift.

For macroblocks whose AVC decoding was not bypassed, the actual pixel data is available at the MPEG-2 encoder. In such cases, the motions provided by the AVC decoder can be improved with motion refinement. Using half-pixel (or integer pixel and half-pixel) refinement helps to ensure that a reasonable MPEG-2 motion vector is found, even though the AVC blocks may have had several different motions due to sub-blocks within the macroblock moving differently.

When a macroblock was coded as intra in AVC, the MPEG-2 encoder will not directly receive any useful motion information about that macroblock. Due to AVC's complicated intra prediction capabilities, the macroblock may have been coded very efficiently in AVC. However, MPEG-2's intra prediction is considerably more limited, and it is likely that coding the macroblock as intra in MPEG-2 will result in a large expenditure of bits. If a large number of AVC intra macroblocks are simply coded as intra in MPEG-2, the increase in bit production can force the rate control to decrease quality substantially, with unacceptable results. To avoid such quality loss, reasonable motion vectors for these AVC intra macroblocks must be found.

A relatively simple solution is to generate a short list of candidate motion vectors from the motion vectors of neighboring macroblocks, and optionally include other likely candidates (such as the zero vector). The candidate motion vector with the least residual error is chosen if its residual error is less than some measure of the cost of intra coding. For example, the sum of absolute differences for the measure of residual error might be used, and the sum of absolute differences of the zero-mean intra macroblock (i.e., the intra macroblock with its mean subtracted) as the measure of intra coding cost. If inter prediction is selected, the resulting motion vector is also able to be refined. The relatively modest cost of searching candidate motion vectors for AVC intra macroblocks yields significant coding gains compared with simply coding these MPEG-2 macroblocks as intra.

Motion refinement, or motion estimation from a small list of candidates, can also be important for ensuring that compatible motions are found for the two fields in a macroblock, as discussed above, in Section II.B.

Re-use of the AVC prediction residual can be implemented in two ways: In the spatial domain or in the compressed domain. Section IV describes one embodiment for directly transforming the residual from the AVC domain to the DCT domain, and there are certainly computational benefits to be realized by doing so. However, in situations where several groups of pictures (GOPs) of the input sequence are buffered before coding, the cost of storing the transform domain residual may be prohibitive in terms of memory consumption. The alternative is to re-use the residual in the spatial domain, which is more complex in terms of operations count, but can be implemented without affecting memory consumption.

The way in which the residual is re-used will affect the MPEG-2 encoder's rate control mechanism. Rate control often depends on some measure of the prediction residual to estimate the frame's complexity, and hence to allocate bits among the different frames. If the measure is in the spatial domain but the residual re-use is in the transform domain, then a method is needed for relating the desired measure to the available data. For measures such as the sum of squared errors, there is little problem since there is a direct mathematical relationship between energies in the spatial and transform domains. For other measures, such as sum of absolute errors, approximations must be used.

IV. Fast Conversion from the AVC Transform Domain to the DCT Transform Domain

This section describes a method of converting from the AVC transform domain to the DCT transform domain. Such functionality is beneficial in transcoding a video sequence from the AVC format to another format that uses the DCT, such as MPEG-2. A straightforward but brute-force method for such a conversion is to perform the inverse AVC transform followed by the forward DCT transform, which is here called the "cascaded" approach. The technique introduced here provides a computationally efficient, yet mathematically identical, alternative to the cascaded approach. Computational savings come from two sources: Fast transformation of two length-four AVC vectors to a single length-eight DCT vector; and from skipping parts of the fast transformation due to some AVC blocks having coefficients that are all zero.

The description below focuses on the one-dimensional case, since the separable extension to two dimensions is straightforward. Vectors x, y, and z (Equation 10) represent data in the spatial, AVC, and DCT domains, respectively. The 4×4 matrix H, in Equation (8), is the forward AVC transform, and the 4×4 matrix K, in Equation (9), is the inverse AVC transform:

$$H = \begin{bmatrix} 1 & 1 & 1 & 1 \\ 2 & 1 & -1 & -2 \\ 1 & -1 & -1 & 1 \\ 1 & -2 & 2 & -1 \end{bmatrix}, \quad (8)$$

$$K = \begin{bmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{bmatrix} \quad (9)$$

Note that the inverse of H is not K, because during inverse quantization of AVC decoding the AVC coefficients are scaled by some W so as to make implementation of K simpler. The 8×8 matrix D denotes the forward DCT transform. Thus $$y = Hx \quad (10)$$

$$x = KWy$$

$$z = D\begin{bmatrix} x_1 \\ x_2 \end{bmatrix}$$

The vectors $x_1$ and $x_2$ in Equation (10) represent separate 4×1 vectors that compose the single 8×1 vector that is the basic DCT size in MPEG-2. After assigning, $$\hat{y} = Wy$$

i.e. the AVC coefficients after dequantization as specified in the standard, the composite transformation between the AVC domain and the DCT domain is given in Equation (11):

$$z = D\begin{bmatrix} K & 0 \\ 0 & K \end{bmatrix}\begin{bmatrix} \hat{y}_1 \\ \hat{y}_2 \end{bmatrix} \quad (11)$$

$$= T\begin{bmatrix} \hat{y}_1 \\ \hat{y}_2 \end{bmatrix},$$

where T is the composite of the inverse AVC and forward DCT transforms.

To enable more efficient implementation of T, the scaling W is modified during AVC de-quantization. For one-dimensional data, the scaling is an element-wise multiplication by the constants.

$$\begin{bmatrix} \frac{\sqrt{2}}{2} & \frac{2\sqrt{5}}{5} & \frac{\sqrt{2}}{2} & \frac{2\sqrt{5}}{5} \end{bmatrix}.$$

When extended to a two-dimensional 4×4 block of AVC coefficients, the scaling is an element-wise multiplication by the entries in the matrix in Equation (12):

$$\begin{bmatrix} \frac{1}{2} & \frac{\sqrt{10}}{5} & \frac{1}{2} & \frac{\sqrt{10}}{5} \\ \frac{\sqrt{10}}{5} & \frac{4}{5} & \frac{\sqrt{10}}{5} & \frac{4}{5} \\ \frac{1}{2} & \frac{\sqrt{10}}{5} & \frac{1}{2} & \frac{\sqrt{10}}{5} \\ \frac{\sqrt{10}}{5} & \frac{4}{5} & \frac{\sqrt{10}}{5} & \frac{4}{5} \end{bmatrix}. \quad (12)$$

The scaling introduces no additional complexity to the AVC decoder, because the existing scaling procedure is simply modified according to the scaling matrix in Equation (12).

Given these modified AVC coefficients, the transformation matrix between the AVC and DCT domain is given by Equation (13):

$$T_A = \begin{bmatrix} 1.00000 & 0.00000 & 0.00000 & 0.00000 & 1.00000 & 0.00000 & 0.00000 & 0.00000 \\ 0.90612 & 0.41307 & -0.07466 & 0.05230 & -0.90612 & 0.41307 & 0.07466 & 0.05230 \\ 0.00000 & 0.99748 & 0.00000 & 0.07089 & 0.00000 & -0.99748 & 0.00000 & -0.07089 \\ -0.31819 & 0.79599 & 0.51328 & -0.04122 & 0.31819 & 0.79599 & -0.51328 & -0.04122 \\ 0.00000 & 0.00000 & 1.00000 & 0.00000 & 0.00000 & 0.00000 & 1.00000 & 0.00000 \\ 0.21261 & -0.38632 & 0.76818 & 0.46417 & -0.21261 & -0.38632 & -0.76818 & 0.46417 \\ 0.00000 & -0.07089 & 0.00000 & 0.99748 & 0.00000 & 0.07089 & 0.00000 & -0.99748 \\ -0.18024 & 0.21572 & -0.37533 & 0.88324 & 0.18024 & 0.21572 & 0.37533 & 0.88324 \end{bmatrix} \quad (13)$$

Figure 9:
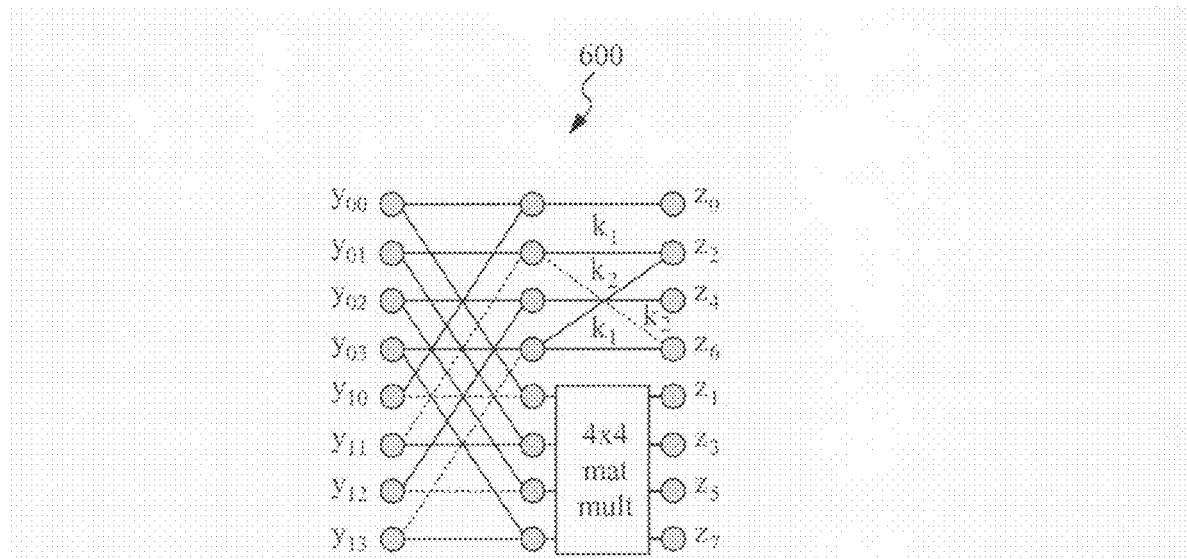
FIG. 9 shows a signal flow for an AVC-to-DCT transform in accordance with the present invention.

The implementation of $T_A$ has a signal-flow 600 as shown in FIG. 9, showing a signal flow for AVC-to-DCT transform, where dotted lines represent negation prior to summation. $y_{ij}$ represents the $j^{th}$ (of the four) coefficients of $y_i$, and $z_j$ represents the $j^{th}$ DCT coefficient in z.

The constants $k_1$ and $k_2$ in FIG. 9 are given by Equations (14) and (15):

$$k_1 = \sqrt{\frac{10 + 7\sqrt{2}}{20}}, \quad (14)$$

$$k_2 = \sqrt{\frac{10 - 7\sqrt{2}}{20}}. \quad (15)$$

The elements of the matrix in the 4×4 matrix multiply for the AVC-to-DCT transform are given by Equation (16):

$$A = \begin{bmatrix} 0.906127446352889 & 0.413066444009152 & -0.074657834050343 & 0.052300780247911 \\ -0.318189645143209 & 0.795989809981466 & 0.513279967159337 & -0.041221929142374 \\ 0.212607523691814 & -0.386319731414652 & 0.768177756711416 & 0.464174579315975 \\ -0.180239955501737 & 0.215716017854529 & -0.375330277517865 & 0.883236854337543 \end{bmatrix} \quad (16)$$

This matrix is able to be factored into the product of four simpler matrices, given in Equation (17):

$$A = A_4 A_3 A_2 A_1, \quad (17)$$

where the individual matrices are given in Equations (18)-(21):

$$A_1 = \begin{bmatrix} 1 & 0 & 1 & 0 \\ 0 & \sqrt{\frac{2}{5}} & 0 & -2\sqrt{\frac{2}{5}} \\ -1 & 0 & 1 & 0 \\ 0 & 2\sqrt{\frac{2}{5}} & 0 & \sqrt{\frac{2}{5}} \end{bmatrix}, \quad (18)$$

$$A_2 = \begin{bmatrix} \sqrt{\frac{1}{8}}\cos\left(\frac{\pi}{16}\right) & 0 & 0 & -\sqrt{\frac{1}{8}}\sin\left(\frac{\pi}{16}\right) \\ 0 & \sqrt{\frac{1}{8}}\cos\left(\frac{3\pi}{16}\right) & -\sqrt{\frac{1}{8}}\sin\left(\frac{3\pi}{16}\right) & 0 \\ 0 & \sqrt{\frac{1}{8}}\sin\left(\frac{3\pi}{16}\right) & \sqrt{\frac{1}{8}}\cos\left(\frac{3\pi}{16}\right) & 0 \\ \sqrt{\frac{1}{8}}\sin\left(\frac{\pi}{16}\right) & 0 & 0 & \sqrt{\frac{1}{8}}\cos\left(\frac{\pi}{16}\right) \end{bmatrix} \quad (19)$$

$$A_3 = \begin{bmatrix} 1 & 1 & 0 & 0 \\ 1 & -1 & 0 & 0 \\ 0 & 0 & 1 & -1 \\ 0 & 0 & 1 & 1 \end{bmatrix} \quad (20)$$

$$A_4 = \begin{bmatrix} 1 & 0 & -1 & 0 \\ 0 & 0 & 0 & \sqrt{2} \\ 0 & \sqrt{2} & 0 & 0 \\ -1 & 0 & -1 & 0 \end{bmatrix}. \quad (21)$$

These four stages, whose results are the odd symmetric DCT coefficients, are similar to the stages for the odd coefficients in various implementations of fast DCT transforms. Note that although the total operation count for application of these four stages may not differ greatly from direct implementation of the 4×4 matrix multiply, the symmetry of the various stages may lend itself to more efficient implementation.

Figure 10:
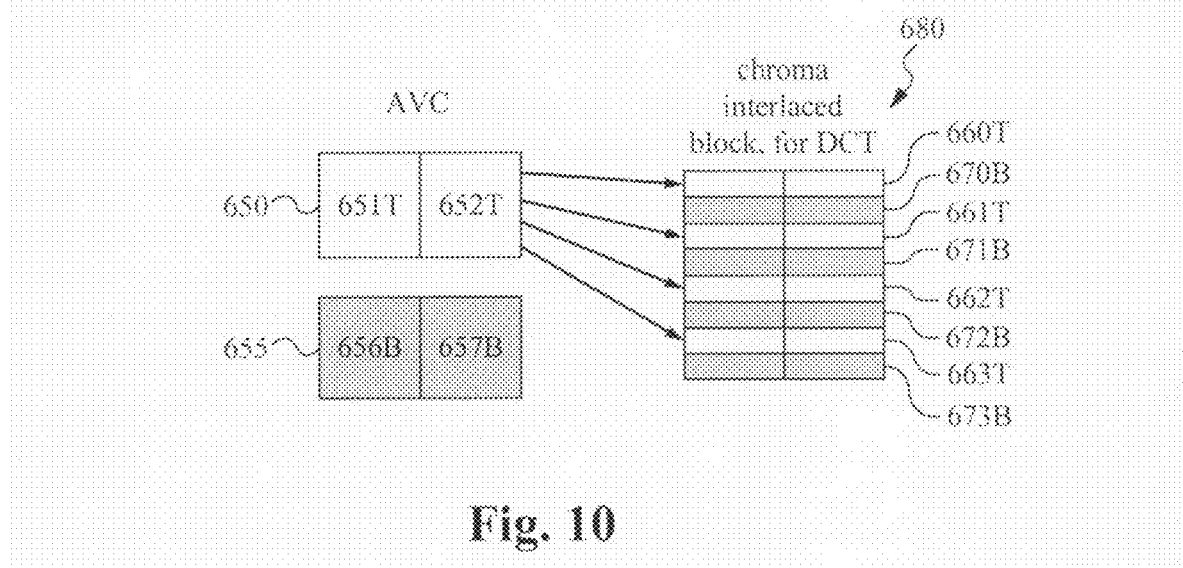
FIG. 10 shows interleaving chroma data from AVC fields before generating corresponding MPEG-2 field DCTs, in accordance with the present invention.

When transforming chroma data from AVC fields to MPEG-2 frames, a modification to the transform is required. An example of this modification is illustrated using FIG. 10, which shows two 4×4 AVC blocks 651T and 652T that represent the top chroma field 650 and two 4×4 AVC blocks 656B and 657B that represent the bottom chroma field 655. For MPEG-2, the rows of chroma pixel data are interleaved before taking the DCT, as depicted in FIG. 10, showing the data 660T, 661T, 662T, and 663T interleaved among the data 670B, 671B, 672B, and 673B.

Figure 11:
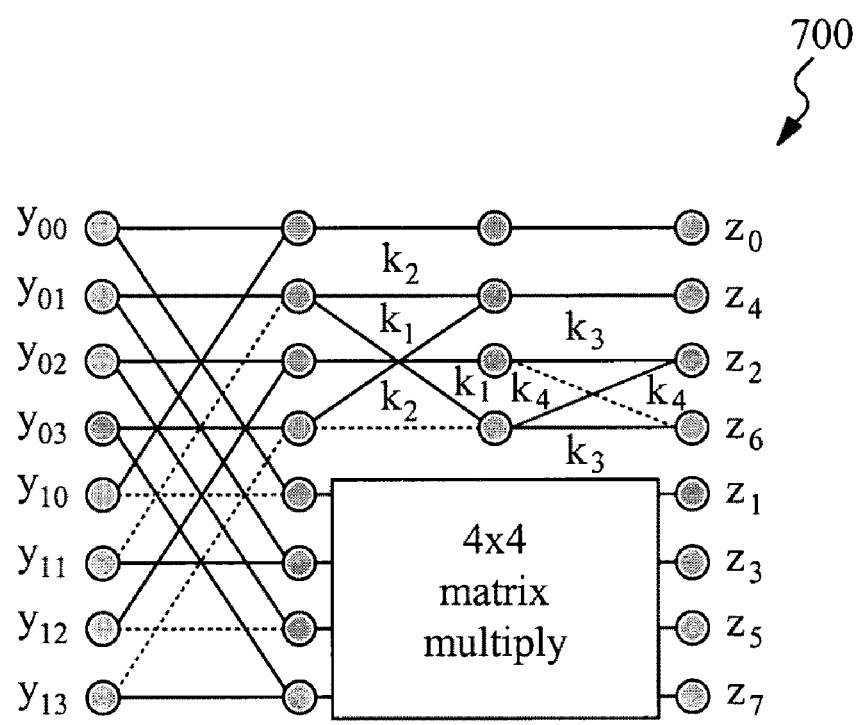
FIG. 11 shows a modified transform for use with the columns of chroma data, in accordance with the present invention.

The AVC-to-DCT transform on the rows is able to be implemented as described above, but when transforming the columns the transform of Equation (22) is required:

Referring to FIG. 11, the constants $k_1$, $k_2$, $k_3$, and $k_4$ are given in Equations (23)-(26):

$$k_1 = \frac{3\sqrt{10}}{10} \quad (23)$$

$$k_2 = \frac{\sqrt{10}}{10} \quad (24)$$

$$k_4 = \sin\left(\frac{\pi}{8}\right) \quad (25)$$

$$k_3 = \cos\left(\frac{\pi}{8}\right) \quad (26)$$

$$T_B = \begin{bmatrix} 1.00000 & 0.00000 & 0.00000 & 0.00000 & 1.00000 & 0.00000 & 0.00000 & 0.00000 \\ 0.18024 & 0.97832 & -0.07466 & 0.06953 & -0.18024 & 0.97832 & 0.07466 & 0.06953 \\ 0.00000 & 0.36305 & 0.92388 & -0.12102 & 0.00000 & -0.36305 & 0.92388 & 0.12102 \\ 0.21261 & -0.05894 & 0.51328 & 0.82938 & -0.21261 & -0.05894 & -0.51328 & 0.82938 \\ 0.00000 & 0.31623 & 0.00000 & 0.94868 & 0.00000 & -0.31623 & 0.00000 & -0.94868 \\ 0.31819 & 0.03938 & 0.76818 & -0.55417 & -0.31819 & 0.03938 & -0.76818 & -0.55417 \\ 0.00000 & 0.87647 & -0.38268 & -0.29216 & 0.00000 & -0.87647 & -0.38268 & 0.29216 \\ 0.90613 & -0.19460 & -0.37533 & -0.01383 & -0.90613 & -0.19460 & 0.37533 & -0.01383 \end{bmatrix}. \quad (22)$$

The elements of the matrix in the 4×4 matrix multiply for the interlaced chroma AVC-to-DCT transform are given in Equation (27):

$$B = \begin{bmatrix} 0.18023995\,5501737 & 0.97831782\,9438102 & -0.07465783\,4050343 & 0.06952690\,7447147 \\ 0.21260752\,3691814 & -0.05894206\,6051305 & 0.51327996\,7159337 & 0.82937780\,8379359 \\ 0.31818964\,5143208 & 0.03938382\,9410310 & 0.76817775\,6711416 & -0.55417253\,4323413 \\ 0.90612744\,6352888 & -0.19459951\,5503261 & -0.37533027\,7517865 & -0.01382976\,1756898 \end{bmatrix} \quad (27)$$

FIG. 11 shows the modified transform 700 for use with the columns of interlaced chroma data. The transform 700 is an AVC-to-DCT transform for interlaced chroma columns in MPEG-2. Additional complexity is apparent in the need for an additional stage in the computation of the even DCT coefficients.

As was the case previously, this matrix is able to be factored into the product of several simpler matrices, as given in Equation (28):

$$B = B_5 B_4 B_3 B_2 B_1, \quad (28)$$

where the individual matrices are given in Equations (29)-(33):

$$B_1 = \begin{bmatrix} 1 & 0 & -1 & 0 \\ 0 & 2\sqrt{\frac{2}{5}} & 0 & \sqrt{\frac{2}{5}} \\ 1 & 0 & 1 & 0 \\ 0 & -\sqrt{\frac{2}{5}} & 0 & 2\sqrt{\frac{2}{5}} \end{bmatrix} \quad (29)$$

$$B_2 = \begin{bmatrix} 0 & 1 & 1 & 0 \\ 0 & -1 & 1 & 0 \\ 1 & 0 & 0 & 1 \\ 1 & 0 & 0 & -1 \end{bmatrix} \quad (30)$$

$$B_3 = \begin{bmatrix} \frac{1}{4}\cos\left(\frac{\pi}{16}\right) & 0 & -\frac{1}{4}\sin\left(\frac{\pi}{16}\right) & 0 \\ 0 & \frac{1}{4}\cos\left(\frac{3\pi}{16}\right) & 0 & -\frac{1}{4}\sin\left(\frac{3\pi}{16}\right) \\ \frac{1}{4}\sin\left(\frac{\pi}{16}\right) & 0 & \frac{1}{4}\cos\left(\frac{\pi}{16}\right) & 0 \\ 0 & \frac{1}{4}\sin\left(\frac{3\pi}{16}\right) & 0 & \frac{1}{4}\cos\left(\frac{3\pi}{16}\right) \end{bmatrix} \quad (31)$$

$$B_4 = \begin{bmatrix} 1 & 1 & 0 & 0 \\ 1 & -1 & 0 & 0 \\ 0 & 0 & 1 & 1 \\ 0 & 0 & 1 & -1 \end{bmatrix} \quad (32)$$

$$B_5 = \begin{bmatrix} 0 & \sqrt{2} & 0 & 0 \\ 1 & 0 & 0 & 1 \\ 1 & 0 & 0 & -1 \\ 0 & 0 & \sqrt{2} & 0 \end{bmatrix} \quad (33)$$

Thus computation of the odd DCT coefficients is also more complex than was the case for $T_A$, requiring one additional stage. Depending on the target platform, direct matrix multiply may be more efficient.

All of the AVC-to-DCT transformations just provided are exact, and actual implementation of these transformations requires the use of finite-precision approximations, some of which may simplify implementation; for example, to four decimal digits, $k_1$ in Equation (14) is 0.9975, which can be well approximated as one.

The direct AVC-to-DCT transformations just given reduce complexity relative to full inverse AVC followed by forward DCT. However, additional complexity reductions are possible when one considers that many of the 4×4 AVC blocks will not have any non-zero coefficients, especially when those blocks contain motion residuals.

Without consideration of all-zero sub-blocks, the transformation from the AVC domain to the DCT domain would proceed by separable application of 16 AVC-to-DCT transforms: one transform for each of the eight rows, followed by one transform for each of the eight columns. If, however, only one of the sub-blocks has non-zero coefficients (and it would be known to the AVC decoder which sub-blocks have non-zero coefficients), many operations are able to be trimmed from the transformation processes discussed above. FIGS. 12A-C show one such example, where only the top-left sub-block 805A has non-zero coefficients, and the other three 805B-D have all zeros.

FIGS. 12A-C show how complexity is additionally reduced due to all-zero sub-blocks. For the highlighted column 807, a "partial transform" (which is still exact) can trim the eight additions of the first stage, because the four bottom elements of the input are zero. Additional computational savings are achieved in the example because only 12 of these partial transforms need be evaluated, instead of the normal 16 full transforms.

Referring to FIG. 12A, in the group of blocks 805, only one of the 4×4 AVC blocks 805A has non-zero coefficients. FIG. 12B shows the signal flow 810 for the AVC-to-DCT transform of the column 807 in FIG. 12A. FIG. 12C shows the simplified signal flow 815 for the signal flow 810, in accordance with the present invention, with eight additions removed.

FIG. 13 shows the separable transform 850 of 12 partial transforms instead of 16 full transforms, in accordance with the present invention.

Figure 14:
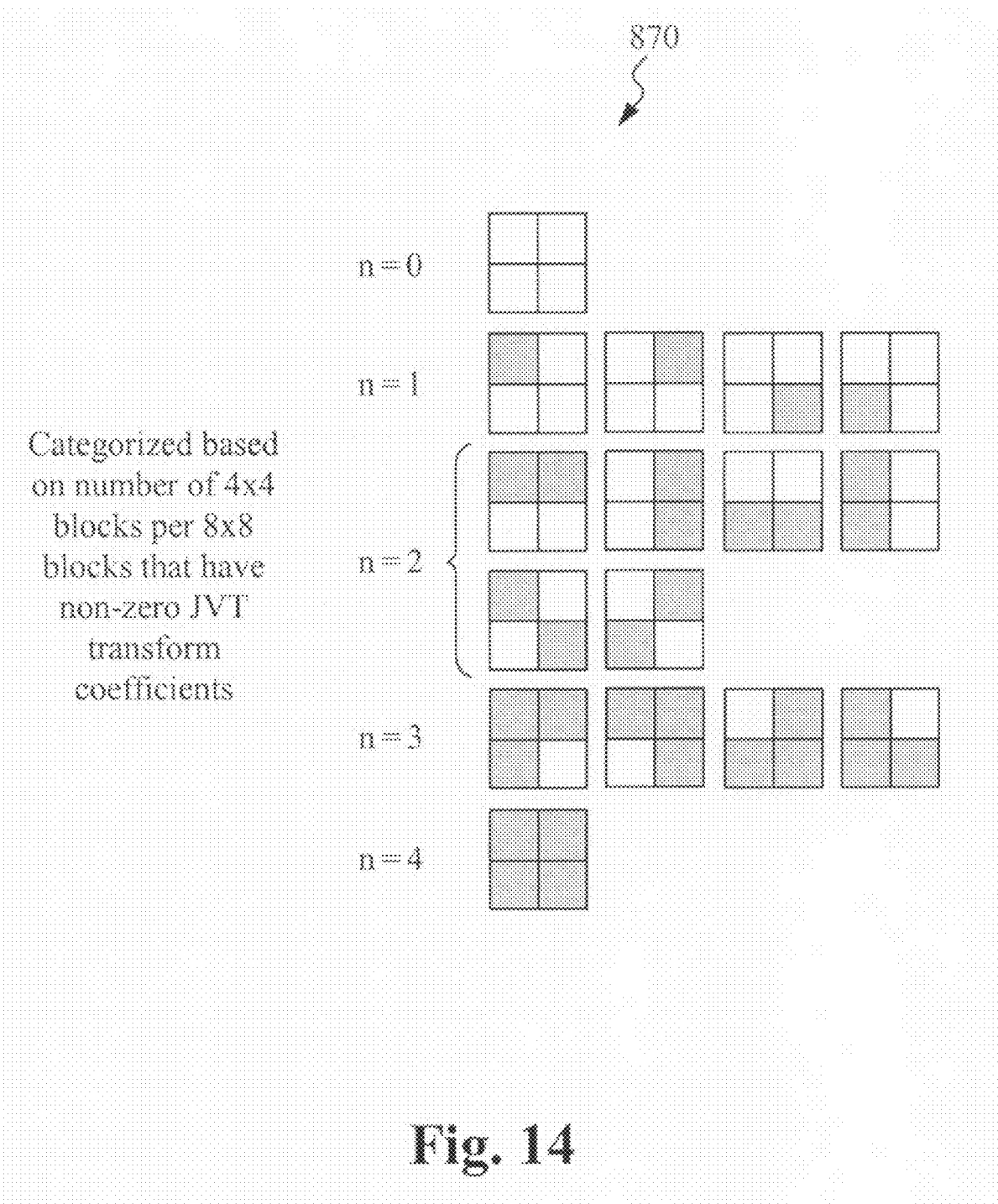
FIG. 14 shows AVC data with various combinations of zero and non-zero sub-blocks, used to describe the embodiments of the present invention.

Similar situations exist for other configurations of zero/non-zero sub-blocks. FIG. 14 shows the possible cases, categorized by the number of non-zero sub-blocks contained within an 8×8 block. In the example of FIG. 14, white blocks contain all zero coefficients and shaded blocks have at least one non-zero coefficient. For n=0, obviously the DCT coefficients are given as zero with no computations. For n=1, 2, or 3, various combinations of partial and full transforms will yield transformations with less complexity than using all full transformations, which in turn have less complexity than the cascaded transformation of inverse AVC and forward DCT. For the case of n=4, i.e. all 4×4 sub-blocks have non-zero coefficients, the full AVC-to-DCT transformation must be used, which is still less complex than the cascaded transformation.

Variations in the computation of the odd DCT coefficients are possible by different factorizations of the 4×4 matrix multiply, and are easily achieved by using other techniques recognized by those skilled in the art.

It is possible that many of the 8×8 DCT blocks will have all zero coefficients. This information can additionally be used to avoid quantization of those 64 DCT coefficients, further reducing complexity.

V. Simulation Results

To evaluate the transcoding algorithm, its performance is compared with that of a cascaded transcoder. A cascaded transcoder is defined as a full AVC decode followed by a full MPEG-2 encode, where the two processes are independent and share no information. PSNR is used as a measure of video quality, while its limitation is acknowledged in evaluation of subjective visual quality. To measure complexity, "clocktick samples", as returned from Intel's VTune Performance Analyzer, are used.

The AVC decoder and the MPEG-2 encoder are based on internal Sony codecs. Complexity reductions are compared for the AVC decoder and the MPEG-2 encoder separately.

The AVC files were all compressed with constant quantization parameter (QP), while the MPEG-2 files were compressed with constant bit rate. Bit rates for the MPEG-2 streams were assigned by doubling the average AVC bit rate (average AVC bit rate=file size divided by sequence duration). Interlaced sequences were compressed in AVC with field coding only. Table 4 shows the results. Positive PSNR differences signify that the transcoded sequence had higher average PSNR than the cascaded sequence.

TABLE 4

| Name | Format | AVC QP | MPEG-2 bitrate, Mbps | Average PSNR difference, dB | Percent decrease in decoder complexity | Percent decrease in encoder complexity |
|---|---|---|---|---|---|---|
| crew | 720 × 480p | 31 | 3.3 | −0.39 | 14 | 28 |
| half | 720 × 480p | 31 | 1.5 | +0.14 | 21 | 40 |
| spark | 720 × 480i | 31 | 7.7 | −0.17 | 11 | 33 |
| seq24 | 1440 × 1088i | 27 | 16.0 | −0.14 | 14 | 42 |
| seq24 | 1440 × 1088i | 31 | 8.3 | +0.38 | 14 | 44 |
| seq24 | 1440 × 1088i | 35 | 5.1 | −0.74 | 16 | 44 |
| seq25 | 1440 × 1088i | 31 | 19.0 | −0.50 | 11 | 38 |
| seq30 | 1440 × 1088i | 31 | 8.1 | +0.10 | 13 | 40 |

Table 4 shows a PSNR and complexity comparison between systems that use prior art cascading and systems that use transcoding in accordance with the present invention.

Table 4 shows that in terms of PSNR, the transcoder provides comparable quality to the cascaded case—sometimes the transcoder is better, sometimes the reverse. PSNR results shown here are for residual re-use in frequency domain. PSNR results actually tend to be better in the spatial domain because the spatial domain method integrates more nicely with the existing MPEG-2 rate control.

Figure 15:
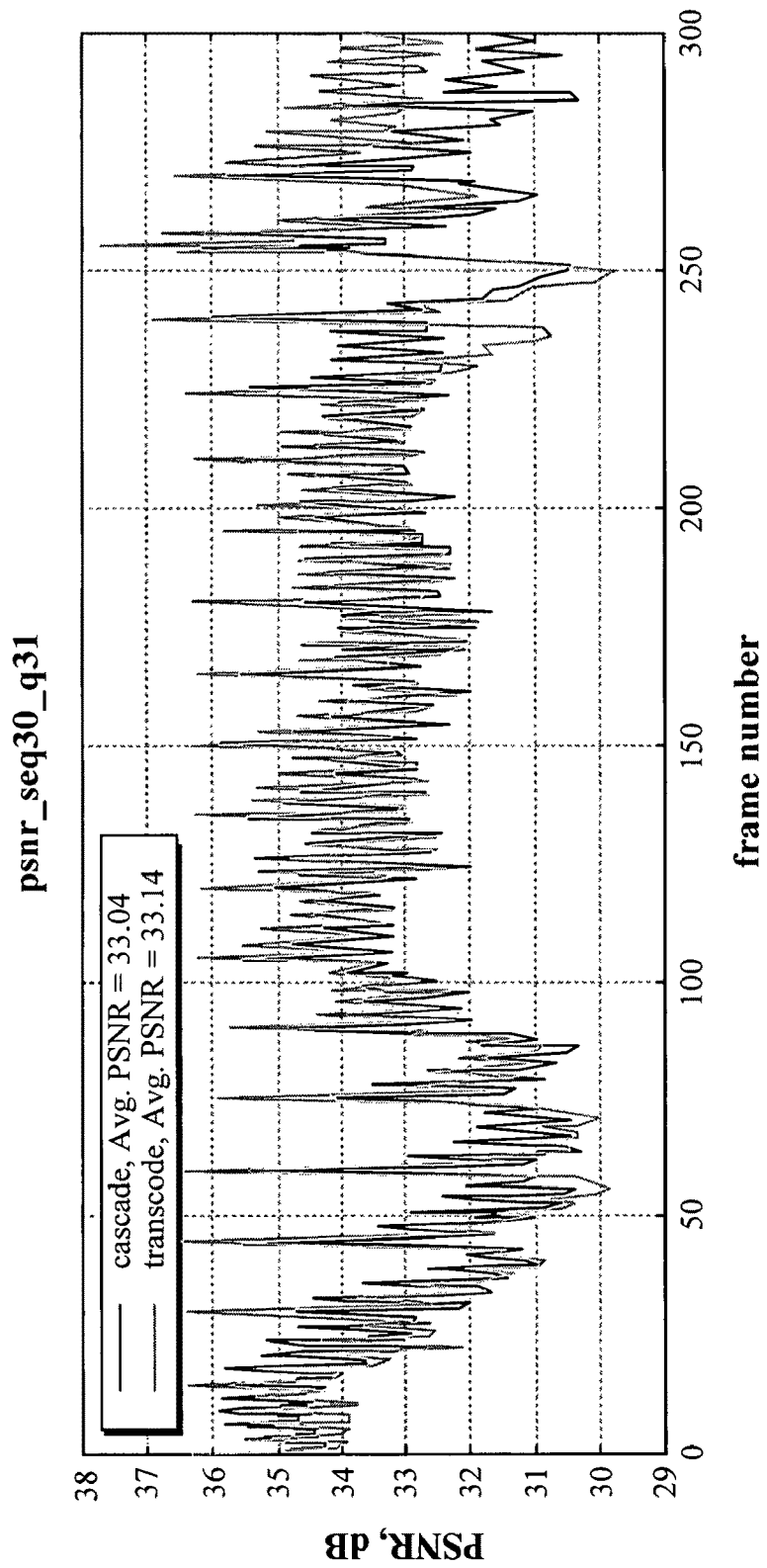
FIG. 15 is a graph illustrating Peak Signal-to-Noise Ratio (PSNR) as a function of frame number, to describe results achieved using embodiments of the present invention.

Average PSNR as given in Table 4 does not indicate quality on a frame-by-frame basis. FIG. 15 is a graph showing PSNR as a function of frame number, for the seq30 sequence shown in Table 4. In most cases, the PSNR for the transcoder tracks relatively closely the PSNR for the cascaded case. However, there are notable exceptions: Between frames 230 and 240, for example, the transcoded PSNR drops significantly below the cascaded PSNR. During this time period, there were many AVC intra macroblocks (due to rapidly changing scene content), and the transcoder was unable to determine good motion vectors for these macroblocks. To avoid such brief dips in quality, the transcoder is able to be modified to perform more thorough motion estimation/refinement when it detects situations where there are abnormally large numbers of AVC intra macroblocks. On the other hand, as shown in FIG. 15, the transcoded PSNR is considerably higher than the cascaded PSNR for the last 30 frames of the sequence, making the average PSNR's very close.

Figure 16:
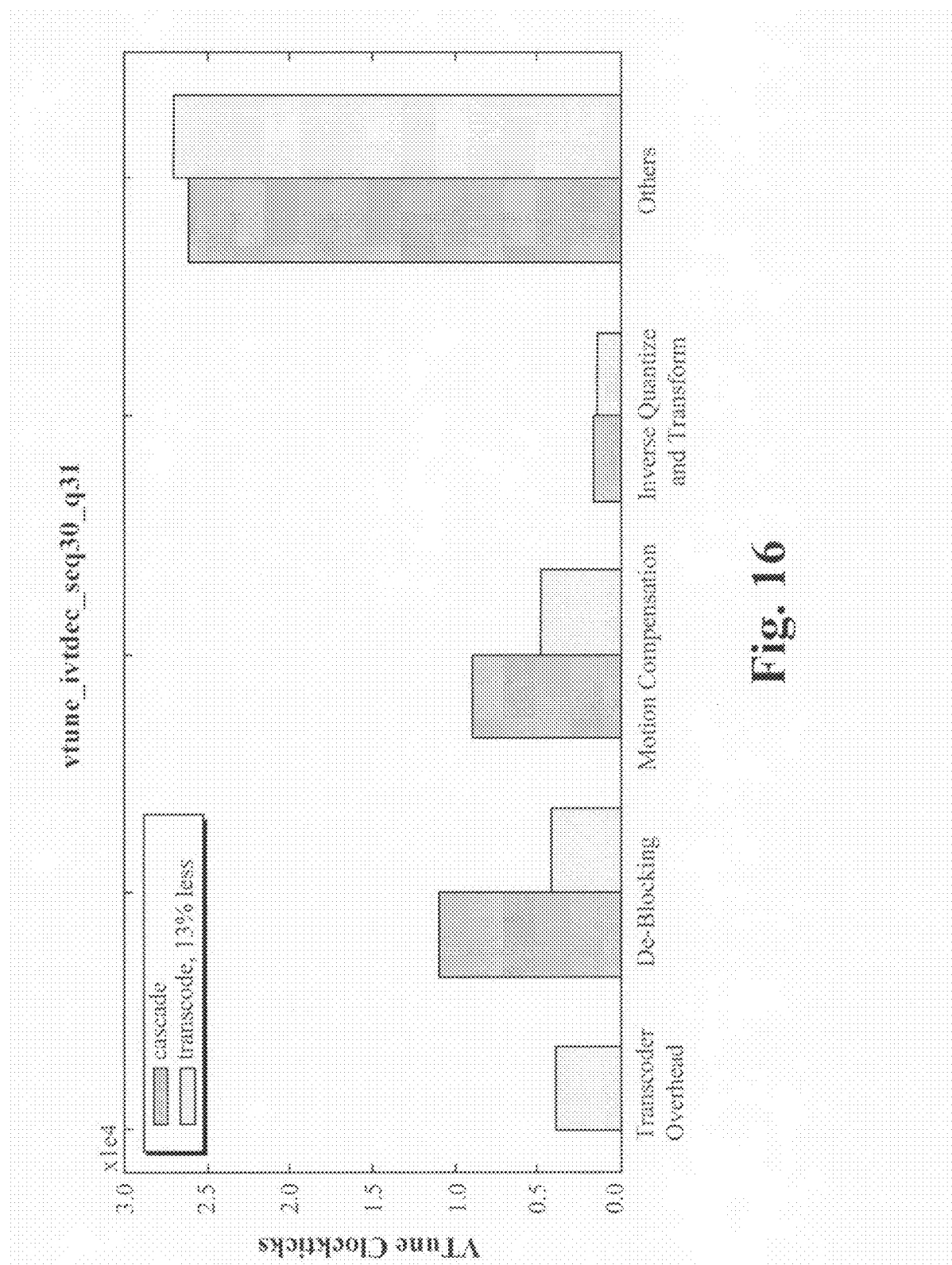
FIG. 16 is a bar graph illustrating the reduction in the complexities of various decoding modules of the transcoder, using embodiments of the present invention.

FIG. 16 is a bar graph illustrating a complexity breakdown for the AVC decoder for the seq30 sequence. A significant amount of complexity reduction is due to the simple disabling of the de-blocking filter for B pictures. Bypassing macroblock decoding also led to significant reduction in complexity for motion compensation. Since inverse quantization and transformation are not significant sources of complexity, their bypassing has little effect on overall complexity. Transcoder overhead (represented by both "Transcoder Overhead" and "Others" in FIG. 16) diminishes complexity gains. Overhead depends on the actual implementation, and performance should be better for a more-optimized AVC decoder; however, it is difficult to predict how much additional complexity reduction is able to be achieved.

Figure 17:
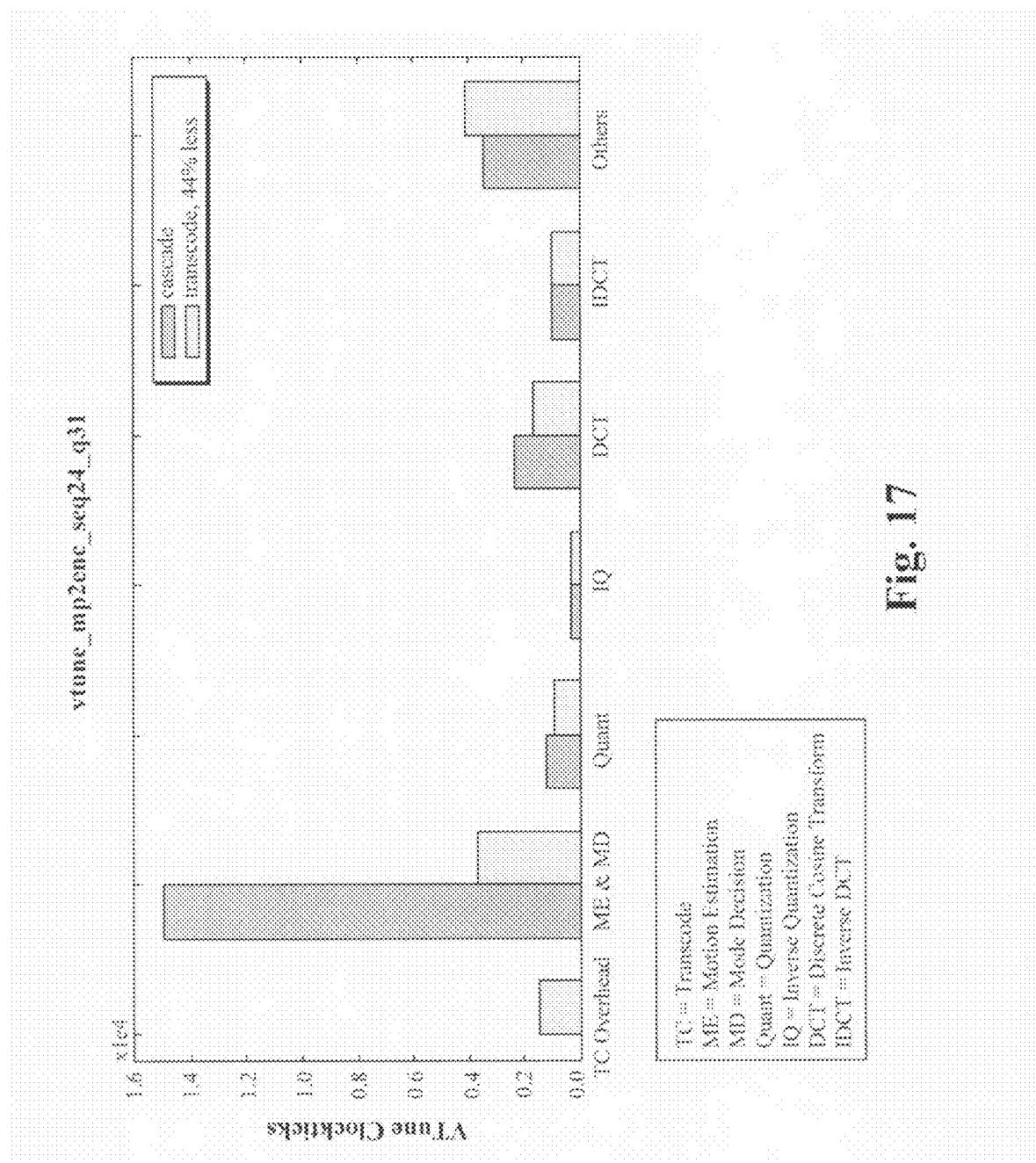
FIG. 17 is a bar graph illustrating the reduction in the complexities of various encoding modules of the transcoder, using embodiments of the present invention.

FIG. 17 is a bar graph illustrating a complexity breakdown at the MPEG-2 encoder for the seq24 sequence, when the AVC QP was 31. Encoder complexity has been measured for the spatial domain residual re-use method.

Even though the residual re-use reported in FIG. 17 is only for the spatial domain, there are still complexity reductions in the DCT and Quantization modules. These complexity gains arise because information in the AVC domain allowed the MPEG-2 encoder to bypass the DCT and quantization for blocks that had only zero-valued coefficients.

Based on the tests thus far, the complexity reductions are approximately 15 percent for the AVC decoder and 40 percent for the MPEG-2 encoder. Prior analysis suggested that the complexity for a cascaded transcoder consisted of about 40 percent from the AVC decoder and 60 percent from the MPEG-2 encoder. These numbers suggest that the overall complexity reduction with the transcoder reported here is about 15×0.40+40×0.60=30 percent.

In operation, when transcoding first video data in a first format to second video data in a second format, a decoder reads the first video data and determines what portion of the first video data is able to bypass processing, that is, is able to be directly transcoded to the second video data. Any deblocking filters for the first video data are disabled, thereby further reducing processing. The decoder uses the prediction mode of the first video data to determine a prediction mode of the second video data. The process also determines which motion residuals for the first video data are able to be reused as motion residuals for the second video data, thereby reducing the overhead needed to translate motion residuals from the first data to motion residuals for the second data.

VI. Blu-ray AVC to MPEG-2 Transcoding

Embodiments of the present invention are also used to transcode Blu-ray AVC to MPEG-2. To better understand this transcoding, a brief discussion of the algorithm used and some assumptions that are made is provided.

The AVC decoder has several main advantages for transcoding:
  De-blocking is disabled for non-reference B-pictures.
  Some AVC macroblocks in non-reference B pictures will not be fully decoded. For these macroblocks, motion compensation routines (including pixel interpolation) will not be executed. Therefore, these macroblocks will not have decoded pixel data in the output image files.

The MPEG-2 encoder has several main changes for transcoding:
  The transcoder re-uses motion information from AVC when setting MPEG-2 motion vectors.
  For the macroblocks whose motion compensation was bypassed, the MPEG-2 encoder will re-use the prediction residual. Coded block patterns (CBPs) are included in the transcoder data file. These CBPs allow the MPEG-2 encoder to bypass DCT and Quantization for 8×8 blocks that are zero-valued.

Blu-ray AVC allows several kinds of pictures types: Intra-coded pictures (I), forward-predicted pictures (P), bi-predicted reference pictures ($B_R$) and bi-predicted non-reference pictures (B). Tables 5 and 6 in FIG. 18 describe how the MPEG-2 picture types are chosen given the Blu-ray AVC picture types.

Referring to Table 5, the first row 901 indicates that when an AVC frame is an I frame, then the chosen MPEG-2 frame is also an I frame picture type; the second row 903 indicates that when an AVC frame is either a P or a $B_R$ picture type, then the chosen MPEG-2 frame is a P frame; and the third row 905 indicates that when the AVC frame is a B picture type, then the chosen MPEG-2 frame is also a B frame.

Referring to Table 6, the first row 911 indicates that when the AVC field picture type for top and bottom fields (TOP: BOT) is I:P, I:I, or P:I, then the chosen MPEG-2 frame picture type is an I frame; the second row 913 indicates that when the AVC field picture type for top and bottom fields is P:P or $B_R$:$B_R$, then the chosen MPEG-2 frame picture type is a P frame; and the third row 915 indicates that when the AVC field picture type for top and bottom fields is B:B, then the chosen MPEG-2 frame picture type is a B frame.

As one example, using frame-type mapping, the AVC frame sequence I-B-B-P-B-$B_R$-B-P is mapped to the MEG-2 frame sequence I-B-B-P-B-P-B-P. As another example, using field-type mapping, the AVC field sequence IP-BB-BB-PP-BB-$B_R B_R$-BB-PP is mapped to the MPEG-2 field sequence I-B-B-P-B-P-B-P.

It will be appreciated that the MPEG-2 encoder described herein exclusively uses frame pictures, of which there are two coding options at the macroblock level: field-coded or frame-coded.

VII. AVC Decoder in Detail
VII.A Deblocking Filter

In a preferred embodiment, the de-blocking filter is disabled for non-reference B pictures. Disabling de-blocking for non-reference B pictures degrades image quality relative to a fully decoded sequence. However, the degradations from a single non-reference B picture do not affect other pictures. Severity of the degradations depends on the original bit stream: Deblocking is more important for lower AVC bit rates, and disabling the filter for lower AVC bit rates may cause more loss during transcoding compared to higher AVC bit rates.

VII.B Motion Vectors

AVC motion vectors are re-used during MPEG-2 encoding. For a single 16×16 AVC macroblock, the transcoder transmits up to eight motion vectors from AVC to MPEG-2: four MVs for the forward direction, and four MVs for the backward direction. The four MVs per direction correspond to each of the four 8×8 blocks in the MB.

If there is AVC motion for sub-blocks of some of the 8×8 blocks (for example, 4×8), the vector mean is used as the MV for the 8×8 block. If the difference in the sub-blocks' motions is above a threshold, a flag is set to indicate that the 8×8 MV may be unreliable. Using 8×8 as the smallest unit of AVC motion for transcoding is for implementation convenience; retaining the motion for smaller blocks is also possible.

VII.C Motion Compensation

Figures 18, 19:
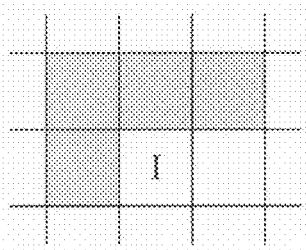
FIG. 18 includes 2 tables describing how MPEG-2 picture types are chosen from Blu-ray AVC picture types in accordance with embodiments of the present invention.
FIG. 19 shows macroblocks that cannot be bypassed when transcoding Blu-ray AVC pictures to MPEG-2 pictures in accordance with embodiments of the present invention.

In non-reference B-pictures, the transcoder is often able to bypass motion compensation (no quarter-pel interpolation, no bi-prediction average). Intra-coded macroblocks are not able to be bypassed, nor may inter-coded macroblocks that are valid spatial predictors for an intra-coded macroblock. In FIG. 19, the shaded blocks are examples of macroblocks for which motion compensation cannot be bypassed. The shaded macroblocks are needed to form the spatial predictor for the intra-coded macroblock, and these blocks must be decoded. More complicated examples exist when considering MBAFF. In FIG. 19, the 1 MB also cannot be bypassed.

An AVC macroblock is able to be bypassed if it is compatible with MPEG-2 coding. A 16×16 AVC frame macroblock corresponds to a 16×16 MPEG-2 frame macroblock, and the motion and prediction structure must be compatible between AVC and MPEG-2 in order to bypass motion compensation. A 16×16 AVC field macroblock corresponds to two 16×8 portions of two MPEG-2 macroblocks. To bypass a 16×16 AVC field macroblock, the upper half of the AVC MB must be compatible with the corresponding part of the 16×8 MPEG-2 block, and the lower half of the AVC MB must be compatible with the corresponding part of the 16×8 MPEG-2 block.

The following conditions must be met in order to bypass the motion compensation of an AVC frame macroblock:
1. The MB is not intra.
2. The MB is not a spatial predictor for an intra MB.
3. The AVC motion vector(s) have reference pictures that are valid reference pictures for MPEG-2.
4. If parts of the AVC MB are bi-predicted, the two predictions cannot be from the same direction.
5. If the MB has motions different from 16×16, then all of the following must be met:
   A. The motions must be very similar to each other. Here, "similar" is measured with a threshold.
   B. The prediction types for the entire MB must be the same. In other words, all parts of the MB must be one of the following:
      i. All forward predicted
      ii. All backward predicted
      iii. All bi-predicted For field pictures, the conditions are similar but slightly more complicated. If the macroblock is in the first field received by the decoder, then the following conditions must be met:
1. The MB is not intra.
2. The MB is not a spatial predictor for an intra MB.
3. The AVC motion vector(s) have reference pictures that are valid reference pictures for MPEG-2.
4. If parts of the AVC MB are bi-predicted, the two predictions cannot be from the same direction.
5. If the MB has motions different from 16×16 or 16×8, then all of the following must be met:
   A. The motions within the upper 16×8 must be very similar to each other, and the motions within the lower 16×8 must be very similar to each other. As before, "similar" is measured with a threshold.
   B. The prediction types for the upper 16×8 region must be the same, and the prediction types for the lower 16×8 region must be the same. In other words, the MB must be predicted according to one of the following:
      i. Upper 16×8 all forward, lower 16×8 all forward
      ii. Upper 16×8 all forward, lower 16×8 all backward
      iii. Upper 16×8 all forward, lower 16×8 all bi-predicted
      iv. Upper 16×8 all backward, lower 16×8 all forward
      v. Upper 16×8 all backward, lower 16×8 all backward
      vi. Upper 16×8 all backward, lower 16×8 all bi-predicted
      vii. Upper 16×8 all bi-predicted, lower 16×8 all forward
      viii. Upper 16×8 all bi-predicted, lower 16×8 all backward
      ix. Upper 16×8 all bi-predicted, lower 16×8 all bi-predicted If the macroblock is in the second field received by the decoder, then the following conditions must be met:
0. If the co-located MB of the first field was not bypassed, then use the conditions stated above for the first field. Otherwise use the following conditions:
1. The MB is not intra.
2. The MB is not a spatial predictor for an intra MB.
3. The AVC motion vector(s) have reference pictures that are valid reference pictures for MPEG-2.
4. If parts of the AVC MB are bi-predicted, the two predictions cannot be from the same direction.
5. If the MB has motions different from 16×16 or 16×8, then all of the following must be met:
   A. The motions within the upper 16×8 must be very similar to each other, and the motions within the lower 16×8 must be very similar to each other. As before, "similar" is measured with a threshold.
6. The prediction types for the upper 16×8 region must be the same as the prediction types for the upper 16×8 region of the bypassed co-located macroblock of the first field, and the prediction types for the lower 16×8 region must be the same as the prediction types for the lower 16×8 region of the bypassed co-located macroblock of the first field. In other words, assuming field0 was the bypassed field and field1 is the current field, if A. upper 16×8 of field0 is F, upper 16×8 of field1 must be F
B. lower 16×8 of field0 is F, lower 16×8 of field1 must be F
C. upper 16×8 of field0 is B, upper 16×8 of field1 must be B
D. lower 16×8 of field0 is B, lower 16×8 of field1 must be B
E. upper 16×8 of field0 is BI, upper 16×8 of field1 must be BI
F. lower 16×8 of field0 is BI, lower 16×8 of field1 must be BI It will be appreciated that these conditions for bypassing the motion compensation of an AVC macroblock are stricter than the conditions for non-Blu-ray AVC embodiments given above. Here, 100% compatibility in the prediction structure (F, B, BI) is required between AVC and MPEG-2, whereas in the non-Blu-ray AVC embodiment the compatibility was allowed to be less (according to some thresholds). These stricter requirements have some advantages:

1. They are easier to implement.
2. They are more computationally efficient.
3. They guarantee that no artifacts will appear as a result of bypassing motion compensation.

Advantage 3 is most important. Indeed, it was observed that in order to avoid all artifacts due to bypassing, the thresholds from the non-Blu-ray AVC embodiment had to be very small-so small that the resulting conditions were nearly equivalent to the conditions given here.

VII.D Prediction Residual

For bypassed macroblocks, the MPEG-2 encoder will re-use the prediction residual from the AVC decoder. As discussed in the non-Blu-ray AVC embodiment, the transcoder is able to re-use the residual in the spatial domain or in the frequency domain. In the embodiment for Blu-ray AVC-to-MPEG2, only the spatial domain is used, although there is no reason that the frequency domain could not be used. Table 7 below summarizes some advantages and disadvantages between using the two domains.

TABLE 7

| Spatial Domain | Frequency Domain |
|---|---|
| +Easier and faster to implement | −More complicated to implement |
| +Easier to integrate with MPEG-2 rate control | −More difficult to integrate with MPEG-2 rate control |
| +No memory overhead, since spatial-domain residual is able to be stored in 8-bit image data | −Potentially large memory overhead, since frequency-domain residual needs separate 16-bit buffers |
| −Theoretically less computationally efficient than using frequency domain | +Theoretically more computationally efficient than using spatial domain |

For bypassed macroblocks, there is no image data to store in the output image. Instead of image data, the spatial-domain AVC prediction residual is able to be stored. To fit the residual data into the 8-bit image data, the residual data is divided by 2 and offset such that its range is [0,255], with a value of 128 meaning that the residual value was zero.

VII.E Coded Block Pattern

For bypassed macroblocks, the AVC coded block pattern is transmitted to the MPEG-2 encoder. In particular, one bit for each of the 8×8 blocks (six bits in total, for 4:2:0 color sampling) is set to 1 if the 8×8 block has a non-zero residual, or set to 0 otherwise.

If the frequency-domain residual re-use method is incorporated into the Blu-ray AVC-to-MPEG-2 transcoder, the coded block pattern may need to be extended to include zero/non-zero 4×4 blocks. As discussed in the non-Blu-ray AVC embodiment, knowing which 4×4 frequency-domain blocks are zero/non-zero allows simplifications in the AVC-to-DCT transform.

VIII. MPEG-2 Encoder in Detail

VIII.A. MV Candidates from AVC

Determining good MPEG-2 motion candidates from AVC motion is arguably the most important part of the transcoding procedure. Next, several methods of identifying motion candidates given the AVC motion are discussed.

VIII.A.1 Direct Use:

For AVC frame macroblocks, if the original AVC prediction was for a 16×16 block, then the AVC motion vector is perfectly compatible and is able to be used directly by the MPEG-2 encoder.

Figure 20A:
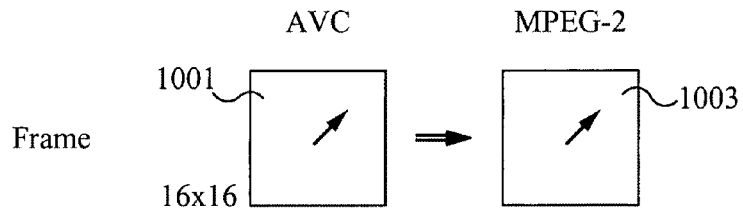
FIGS. 20A and B show how motion vectors are determined for MPEG-2 pictures from Blu-ray AVC frame and field pictures, respectively, in accordance with embodiments of the present invention.
Figure 20B:
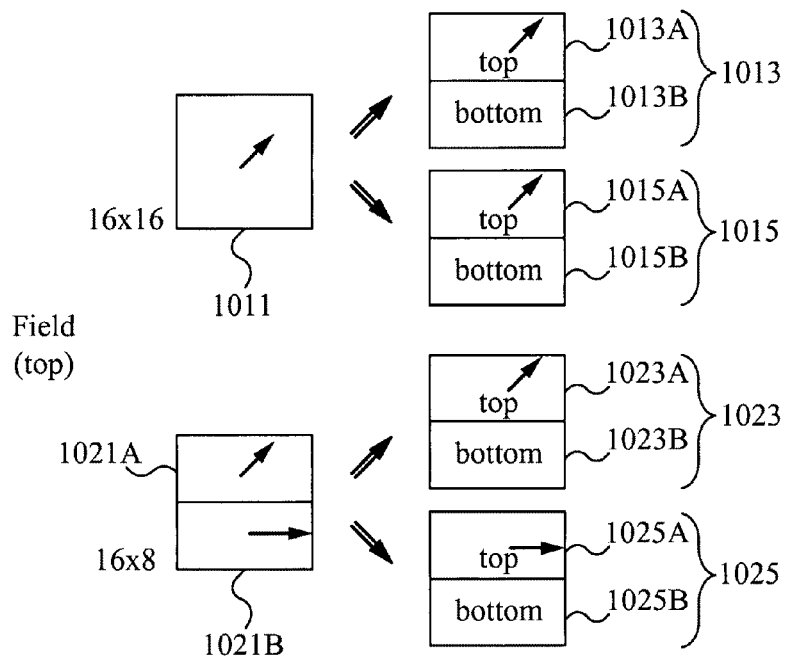

For AVC field macroblocks, if the original AVC predictor was for a 16×16 block or for two 16×8 blocks, then the prediction is perfectly compatible with MPEG-2. For 16×16 prediction, the same AVC motion vector will be used for a single field of two MPEG-2 field-coded macroblocks. For two 16×8 predictions, the MV for the upper 16×8 will be used for a single field of one MPEG-2 MB, and the MV for the lower 16×8 will be used for the same field of another MPEG-2 MB. FIGS. 20A and 20B show examples of both embodiments.

FIG. 20A shows a 16×16 AVC frame macroblock 1001 transcoded into a 16×16 MPEG-2 frame macroblock 1003. FIG. 20B shows a 16×16 field macroblock 1011 transcoded into two MPEG-2 frame macroblocks 1013 and 1015. The MPEG-2 macroblock 1013 includes top and bottom fields 1013A and 1013B, respectively, and the MPEG-2 macroblock 1015 includes top and bottom fields 1015A and 1015B, respectively. The motion vector in the field 1011 is used in both the top fields 1013A and 1015A.

FIG. 20B also shows two 16×8 AVC blocks, 1021A and 1021B, that are transcoded into MPEG-2 frame macroblocks 1023 and 1025. The MPEG-2 macroblock 1023 includes top and bottom fields 1023A and 1023B, respectively, and the MPEG-2 macroblock 1025 includes top and bottom fields 1025A and 1025B, respectively. The motion vector in the block 1021A is used in the top field 1023A and the motion vector in the block 1021B is used in the top field 1025A.

In both cases above, the AVC reference pictures must be valid reference pictures for MPEG-2 frame pictures.

Figure 21:
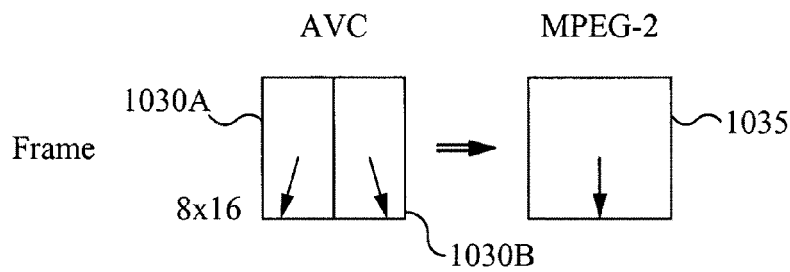
FIG. 21 shows an example of frame prediction in accordance with embodiments of the present invention.

VIII.A.2 Mean:

Often the AVC prediction is not perfectly compatible with MPEG-2. However, if the motion for the AVC sub-blocks is relatively uniform, the mean of these motion vectors is able to be taken as the motion candidate. Preferably, the mean is used as a good motion candidate only when the individual MVs are very similar. FIG. 21 shows an example for frame prediction, in which the motion vectors in the two 8×16 blocks 1030A and 1030B are used to determine the motion vector in the MPEG-2 macroblock 1035.

Again, the AVC reference pictures must be valid reference pictures for MPEG-2 frame pictures.

VIII.A.3 Motion from a Sub-Block.

Due to the complicated prediction structures allowed by AVC, sometimes only one portion of a 16×16 MB will have a prediction that is valid for MPEG-2. For example, suppose that the AVC MB is coded with four 8×8 motion vectors, and that only one of those motion vectors points to a valid MPEG-2 reference frame. In such a case, the MV for the 8×8 sub-block is able to be added as an MPEG-2 candidate for the entire MPEG-2 MB (or one field of the MB, if using field coding). Although there is no guarantee that the 8×8 candidate will be appropriate for the entire 16×16 or 16×8 region in MPEG-2, it is nevertheless a valid candidate.

Figure 22:
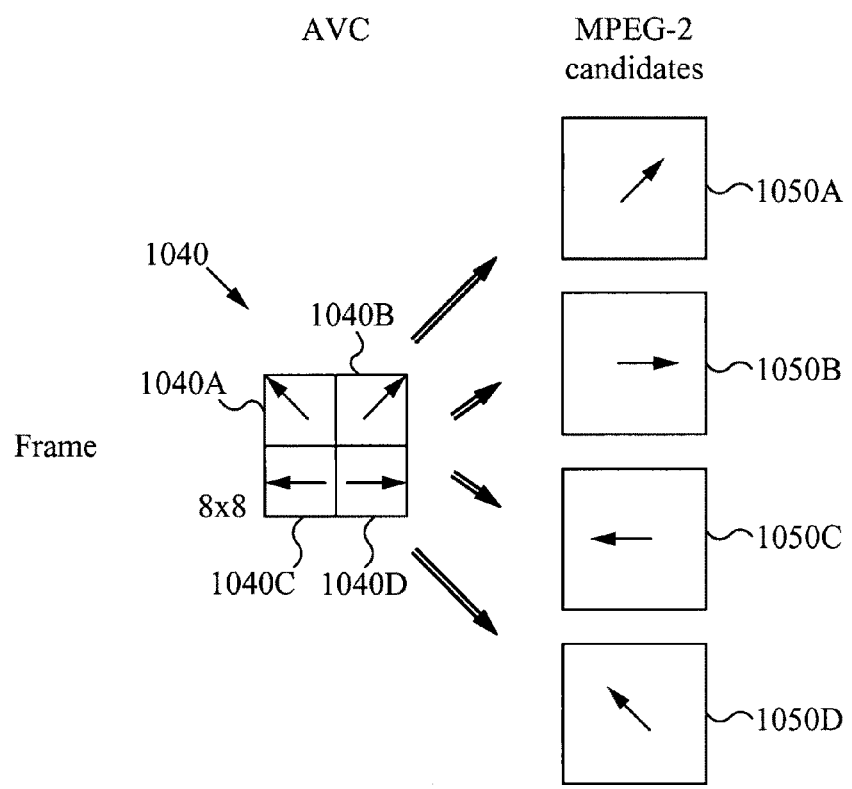
FIG. 22 shows how a list of candidate motion vectors is determined in accordance with embodiments of the present invention.

Another situation in which candidates from sub-blocks are able to be used is when the motion for the sub-blocks is very non-uniform. For example, suppose that the AVC MB is coded with four 8×8 motion vectors, and that they all point to a valid MPEG-2 reference frame, but the actual motions are very non-uniform. In this case, the mean of the MVs is not very meaningful. Instead, several candidates from the individual 8×8 MV's are able to be determined. FIG. 22 shows an example.

As shown in FIG. 22, a macroblock 1040 has four 8×8 motion vectors, 1040A-C. The MPEG-2 candidates include a motion vector 1050A that corresponds to the motion vector 1040B, a motion vector 1050B that corresponds to the motion vector 1040D, a motion vector 1050C that corresponds to the motion vector 1040C, and a motion vector 1050D that corresponds to the motion vector 1040A.

VIII.A.4 Reverse Motion:

Sometimes there may be an AVC motion available that goes from picture A to picture B. However, it is possible that the MPEG-2 encoder needs a motion that goes from picture B to picture A. In this case, a "reverse" motion vector is able to be determined. This situation is only described for frame prediction; the case for field prediction is very similar.

Figure 23:
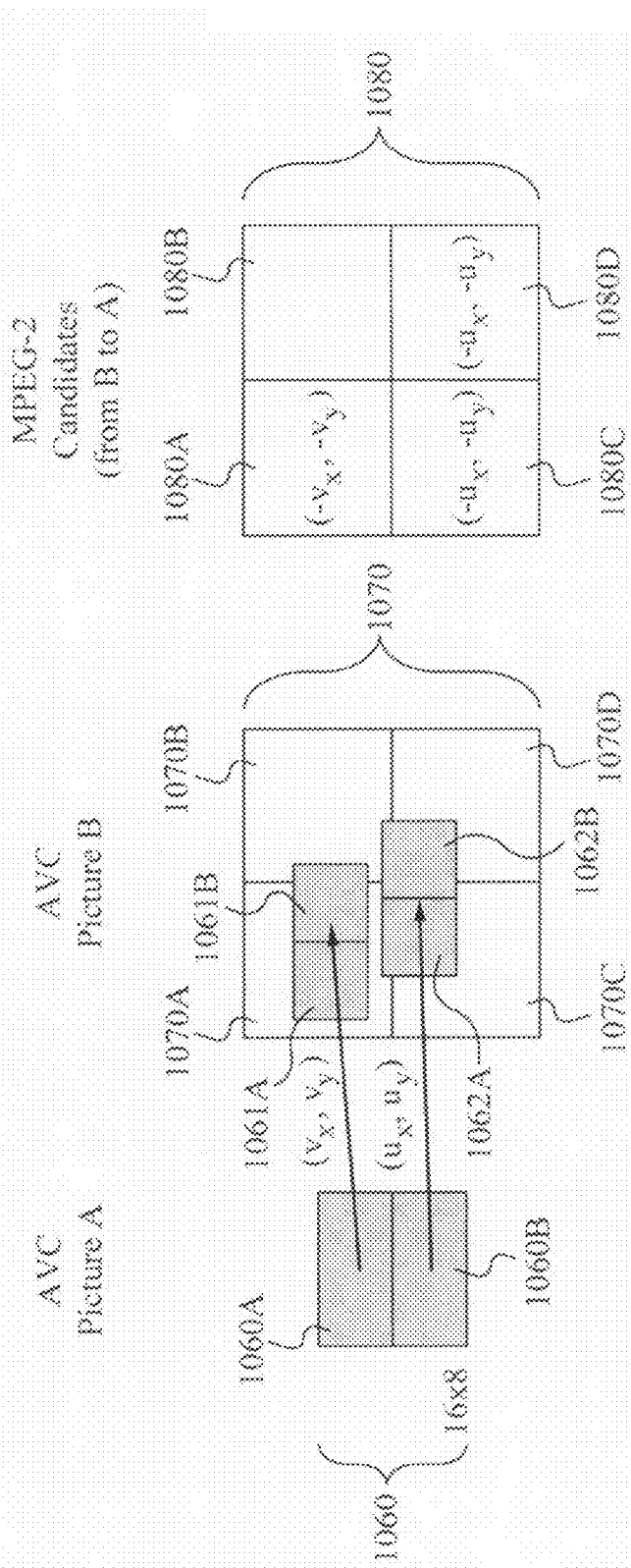
FIGS. 23-25 show how motion vectors are determined for an MPEG-2 frame using reverse motion, concatenate motion, and bi-reverse motion, respectively, in accordance with embodiments of the present invention.

The four 8×8 regions of the AVC MB are considered separately, even if they were coded with bigger blocks. For each 8×8 block with motion vector $(v_x, v_y)$, the MB (in terms of MPEG-2) to which it points in the reference frame is determined. If the 8×8 AVC block is not wholly contained in a single MPEG-2 MB, only the MPEG-2 MB that has the largest overlapping area with the 8×8 AVC block is considered. For that MB, the motion vector $(-v_x, -v_y)$ is then included as a candidate. FIG. 23 shows an example of this.

FIG. 23 shows an AVC macroblock 1060 in a picture A and a collection 1070 of four AVC macroblocks 1070A-D in a picture B. The macroblock 1060 contains a 16×8 block 1060A with a motion vector $(v_x, v_y)$ and a 16×8 block 1060B with a motion vector $(u_x, u_y)$. The motion vector $(v_x, v_y)$ points to blocks 1061A and 1061B in the AVC Picture B, and the motion vector $(u_x, u_y)$ points to blocks 1062A and 1062B in the AVC Picture B. The block 1061A is wholly contained in the macroblock 1070A, the block 1062A mostly overlaps with the macroblock 1070C, the block 1061B mostly overlaps with the macroblock 1070A, and the block 1062B mostly overlaps with the macroblock 1070D. None of the blocks 1061A, 1061B, 1062A, or 1062B mostly overlaps with the macroblock 1070B.

Accordingly, when transcoding from AVC to MPEG-2, and the MPEG-2 picture contains macroblocks 1080A-D that correspond to the AVC macroblocks 1070A-D, respectively; the candidate motion vector for the macroblock 1080A is $(-v_x, -v_y)$, for the macroblock 1080B is undetermined, for the macroblock 1080C is $(-u_x, -u_y)$, and for the macroblock 1080D is $(-u_x, -u_y)$. The text shown inside each of the boxes labeled 1080A-D is the motion vector candidate derived from the motions in the AVC macroblock 1060, according to the "reverse motion" method.

VIII.A.5 Concatenate Motion:

Often an AVC MV will point to a picture that is not a valid MPEG-2 reference frame. Sometimes, multiple motions are able to be concatenated to arrive at a valid MPEG-2 motion.

Figure 24:
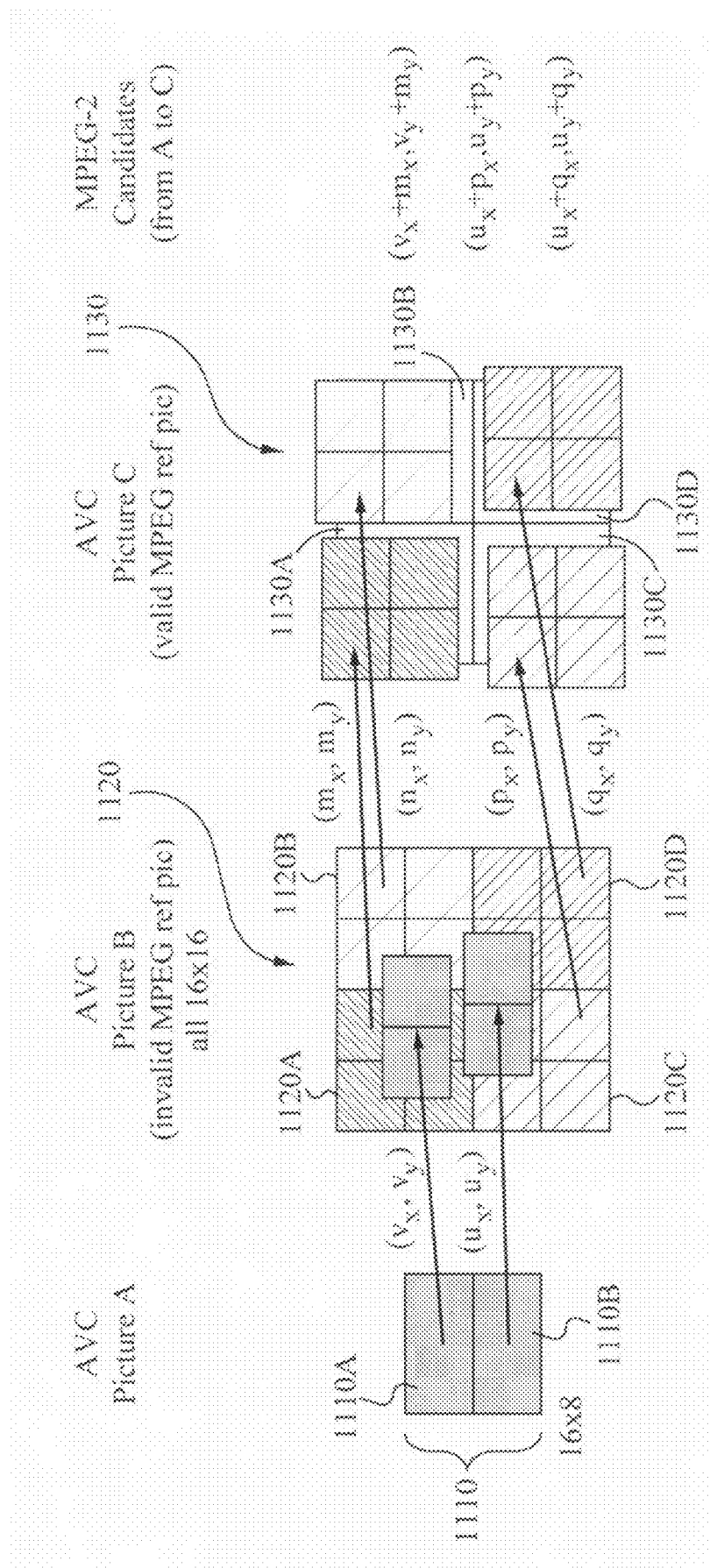

For example, suppose that a motion vector $(v_x, v_y)$ of the second field of an AVC frame references the first field of the AVC frame. Such a prediction is invalid for MPEG-2 frame pictures. However, if the motion vector points to a block that has a motion vector $(m_x, m_y)$ which itself points to a frame that is a valid MPEG-2 reference, then the two motions are able to be concatenated to yield a valid MV, $(m_x+v_x, m_y+v_y)$. FIG. 24 shows an example of this. Note that as with reverse motion, the four 8×8 regions of the AVC MB are considered separately.

FIG. 24 shows an AVC Picture A that contains an AVC macroblock 1110 that has blocks 1110A and 1110B. The blocks 1110A and 1110B contain motion vectors $(v_x, v_y)$ and $(u_x, u_y)$ respectively, that point to locations in an AVC Picture B. The AVC Picture B contains macroblocks 1120A-D with motion vectors $(m_x, m_y)$ $(n_x, n_y)$, $(p_x, p_y)$, and $(q_x, q_y)$, respectively, that point to locations in an AVC Picture C. The AVC Picture C contains macroblocks 1130. The AVC Picture B is an invalid MPEG reference picture and the AVC Picture C is a valid MPEG reference picture.

The motion vector $(v_x, v_y)$ points to macroblock 1120A, overlapping mostly with macroblock 1120A but also with macroblock 1120B. The motion vector $(m_x, m_y)$ in the macroblock 1120A then points to some location in Picture C, overlapping the macroblock 1130A in Picture C. The motion vector $(u_x, u_y)$ points to macroblocks 1120C and 1120D in Picture B. The macroblock 1120C has a motion vector $(p_x, p_y)$ that points to some location in Picture C. The macroblock 1120D has a motion vector $(q_x, q_y)$ that points to some location in Picture C.

Still referring to FIG. 24, the macroblock 1120B has a motion vector $(n_x, n_y)$ that points to a location in Picture C, overlapping macroblock 1130B. The macroblock 1120D has a motion vector $(q_x, q_y)$ that points to a location in Picture C, overlapping macroblock 1130D.

The MPEG-2 candidates shown in FIG. 24 are for the MPEG-2 macroblock that corresponds to the AVC macroblock 1110. The first candidate (v+m) is from concatenating the motion vectors from 1110A and 1120A. The second candidate (u+p) is from concatenating the motion vectors from 1110B and 1120C. The third candidate (u+q) is from concatenating motion vectors from 1110B and 1120D.

VIII.A.6 Bi-Reverse Motion:

Consider a bi-predicted AVC block that takes a reference from list0 of picture A, and a reference from list1 of picture B. The AVC motion is able to be used to get a motion candidate from picture B to picture A. (It is also possible to go from picture A to picture B, in a manner very similar to that presented here.) This method can be visualized as a combination of "reverse motion" and "concatenated motion".

Figure 25:
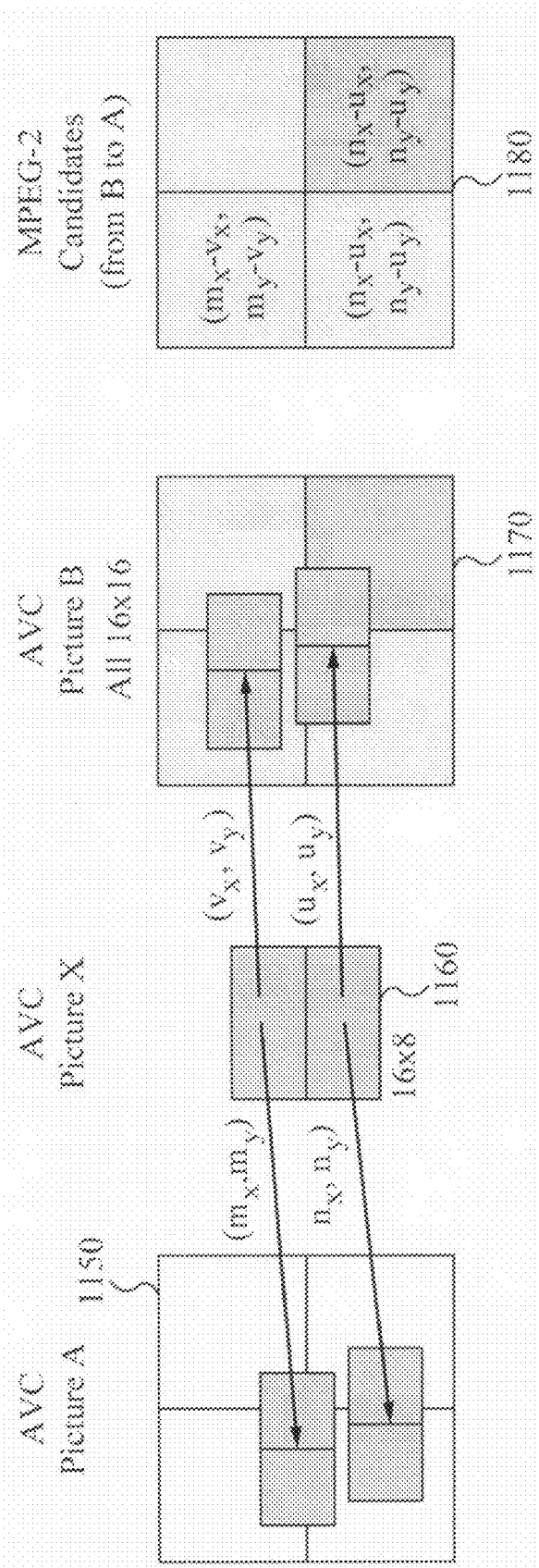

Consider a single 8×8 block of the bi-predicted AVC MB. Suppose its list1 motion vector is $(v_x, v_y)$ and points to an MPEG-2 MB in picture B, and its list0 motion vector is $(m_x, m_y)$ and points to picture A. A candidate for the MPEG-2 MB is able to be formed in picture B which is $(m_x-v_x, m_y-v_y)$. FIG. 25 shows an example of this.

FIG. 25 shows a macroblock 1160 of an AVC Picture X, with motion vectors $(m_x, m_y)$ and $(n_x, n_y)$ that point to several macroblocks 1150 of an AVC Picture A and a motion vector $(v_x, v_y)$ that points to a collection 1170 of four 16×16 macroblocks of an AVC Picture B 1170. The MPEG-2 candidates 1180 for the upper-left block is $(m_x-v_x, m_y-v_y)$, for the upper-right block is undetermined, for the lower-left block is $(n_x-u_x, n_y-u_y)$, and for the lower-right block is $(n_x-u_x, n_y-u_y)$.

VIII.B MV Search and SAD Comparisons

Depending on the characteristics of the MV candidates determined previously, an MV search and Sum of Absolute Differences (SAD) computations are able to be avoided.

If the MB was bypassed, there is no need to perform any SAD computations. Indeed, it is impossible to check other motion vectors for a bypassed MB, since no original image data is available for the computations.

Even if the MB was not bypassed, there are situations where any SAD comparisons are also able to be avoided:
1. If the AVC motion and prediction are perfectly compatible with MPEG-2.
2. If the AVC motion and prediction are almost perfectly compatible with MPEG-2. For example, if the upper and lower 16×8 parts of a frame-coded macroblock are both forward predicted and their motion vectors are very similar.
3. If the quality of the MV candidates from AVC are high enough. Some MV candidates from above may be more reliable than other candidates. If it is determined that a previously derived MV candidate is good enough, there is no need to perform a search.

When it is difficult to determine the quality of the motion candidates, or if there are no motion candidates (for example, AVC intra macroblocks), then SADs must be computed to find the best motion vector. The list of candidate MVs is first augmented by considering the MVs of the macroblock's neighbors. MVs that are very close to those already present should not be added to the list. A maximum number of allowable candidates to search should also be imposed. The maximum number are able to be adjusted to affect the complexity-quality tradeoff.

The SADs for the MV candidates are evaluated, and the MV and mode that give the best SAD are chosen for the macroblock. These SAD computations are only for integer-pixel motions. If better motion vector precision is desired, half-pel refinement is able to be performed, depending on computational constraints.

Even if no MV search and SAD comparisons are performed, it may be desirable to perform half-pixel refinement, again depending on computational constraints. For example, in situations 2 and 3 in the previous list, quality gain from half-pixel refinement is expected.

VIII.C Field vs. Frame Coding

Often the transcoder will take AVC field pictures as input, and produce MPEG-2 frame pictures as output. In areas of the video that contain little motion, often the motion vectors for a macroblock's separate fields are able to be represented more efficiently as a single frame motion vector instead of two field motion vectors. (For bi-prediction, it would be two frame motion vectors instead of four field motion vectors.) Before the transcoder passes its motion information to the actual MPEG-2 encoder, it first checks to see if a field-coded macroblock is able to be converted to a frame-coded macroblock. It performs a simple test to see if the field-coded prediction is able to be identically represented by a frame-coded prediction instead. If so, the macroblock prediction mode is changed to frame.

Simplification from field motion vectors to a frame motion vector is accomplished with the procedure shown in Table 8:

TABLE 8

1. Given: Motion vector $(x_{top}, y_{top})$ of top field in MB, and motion vector $(x_{bot}, y_{bot})$ of bottom field in MB, in the half-pel units used by MPEG-2
2. If $(x_{top} \neq x_{bot})$
   go to 9

TABLE 8-continued

3. If ($y_{top}$ is not integer-pixel, or $y_{bot}$ is not integer-pixel)
   go to 9
4. If (top field is predicted from top field of reference frame)
   $y_{frm\_t} = 2*y_{top}$
   Else
   If (top field is predicted from bottom field of reference frame)
   $y_{frm\_t} = 2*y_{top} + 1$
5. If (bottom field is predicted from bottom field of reference frame)
   $y_{frm\_b} = 2*y_{bot}$
   Else
   If (bottom field is predicted from top field of reference frame)
   $y_{frm\_b} = 2*y_{bot} - 1$
6. If ($y_{frm\_t} \neq y_{frm\_b}$)
   go to 9
7. Simplify to frame motion vector $(x_{top}, y_{frm\_t})$
8. Go to 10
9. Do not simplify to frame motion vector.
10. END The above procedure in Table 8 is applicable when prediction is from a single direction only, e.g., either forward prediction or backward prediction. When prediction is from both directions (bi-prediction), the logic is very similar—but the conditions must be satisfied for the field motion vectors in both directions.

Using the above simplification allows many MBs to be simplified to frame prediction. However, many MBs remain field predicted, even though frame prediction may be preferable. To encourage more frequent frame prediction, the MVs that would allow a field-coded MB to be simplified to a frame-coded MB are included as candidates.

Tables 9 and 10, shown in FIGS. 26 and 27, respectively, show the different circumstances considered. In B frames, ½ pel refinement of a frame MV is not possible when one or both of the original AVC fields were bypassed (there is no image data, so computing SAD is impossible).

Table 9 is used for macroblocks in P-frames. Referring to the first row 1250 in Table 9, if the top field has a good MV from AVC and the bottom field has a good MV from AVC, then the field MVs are checked to see if they simplify to a frame. Optionally, the field/frame MVs are refined. Referring to the second row 1252, if the top field has a good MV from AVC but the bottom field does not have a good MV from AVC, then the MV that combines with top-field motion to simplify to frame prediction is included in the bottom candidates; SADs and MAD for the bottom field are computed, and selection of the final prediction method is biased to favor frame prediction; the best mode is chosen; and, optionally, the field/frame MV is refined. As used herein, the term "good MV" means that the MV from AVC is considered accurate as-is, without requiring further refinement or MV searches."

Referring to the third row 1254, if the top field does not have a good MV from AVC but the bottom field does have a good MV from AVC, then the MV that combines with bottom-field motion to simplify to frame prediction is included in the top candidates; SADs and MAD for the top field are computed, and selection of the final prediction method is biased to favor frame prediction; the best mode is chosen; and, optionally, the field/frame MV is refined.

Referring to the fourth row 1256, if the top field does not have a good MV from AVC and the bottom field does not have a good MV from AVC, then the best candidate for the top field is chosen; the best candidate for the bottom field is chosen; to the bottom-field candidates, add that candidate which allows the best top-field candidate to be simplified to frame prediction; to the top-field candidates, add that candidate which allows the best bottom-field candidate to be simplified to frame prediction; SADs and MAD for both fields are computed, and selection of the final prediction method is biased to favor frame prediction; the best mode is chosen; and, optionally, the field/frame MV is refined.

Table 10 is used for macroblocks in B frames. Referring the first row 1260, if the top and bottom fields are both bypassed, the field MVs are checked to see if they simplify to frame prediction.

Referring to the second row 1262, if the top field is bypassed but the bottom field is not, then the MV(s) that combine with top-field motion to simplify to frame prediction are included in bottom candidates; SADs for the bottom field are computed, and selection of the final prediction method is biased to favor frame prediction; and, the best mode is chosen.

Referring to the third row 1264, if the top field is not bypassed but the bottom field is bypassed, then the MV(s) that combine with bottom-field motion to simplify to frame prediction are included in top candidates; SADs for the top field are computed, and selection of the final prediction method is biased to favor frame prediction; and, the best mode is chosen.

Referring to the fourth row 1266, if neither the top nor the bottom field is bypassed, then if both the top and bottom fields have both forward and backward candidates, and all the candidates are good, then it is determined whether the bidirectional field MV(s) simplify to frame prediction; optionally, the field/frame MV(s) are refined; and the process ENDS. If both the top and bottom fields have forward candidates, and the candidates are both good, then it is determined whether the forward field MVs simplify to frame prediction; optionally, the field/frame MV(s) are refined; and the process ENDS. If both the top and bottom fields have backward candidates, and the candidates are both good, then it is determined whether the backward field MV(s) simplify to frame prediction; optionally, the field/frame MV(s) are refined; and the process ENDS.

Still referring to the row 1266, for each direction, the field/frame candidates are found, as was done for P frames. In this step, it is considered whether the top/bottom field has good MV from AVC for this direction, bias selection of frame prediction, etc. If both directions allow frame prediction, bi-direction frame prediction is used. If only one direction allows frame prediction, frame prediction for just that one direction is used. If no direction allows frame prediction, field prediction is used or intra is used, if no good MV was found.

In experimental testing, including frame candidates in the MV search significantly improved PSNR in sequences with slow motion.

VIII.E Bypassed Motion Compensation, DCT, and Quantization

When part or all of a MB was bypassed from AVC, there is no need to perform motion compensation for the bypassed part(s). Instead, the prediction residual is directly copied to the MPEG-2 array of prediction residuals. This can be done in the spatial domain or the transform domain, as discussed in Sections III and IV.

If the coded block pattern indicates that an 8×8 block of the AVC residual is all zero, then the following are true:
1. That block need not be copied to the MPEG-2 prediction residual.
2. That block need not have the forward DCT applied to it.
3. That block need not have quantization applied to it.

For these 8×8 blocks with zero prediction residual, the corresponding bits of the MPEG-2 coded block pattern are able to be set to zero, and copying, transforming and quantizing the residual are able to be avoided.

It will be readily apparent to one skilled in the art that other modifications may be made to the embodiments without departing from the spirit and scope of the invention as defined by the appended claims.

I claim:

1. A system for transcoding first video data in a first format to second video data in a second format comprising:
   a decoder for selecting a prediction mode of the second video data from a prediction mode of the first video data and for translating first motion vectors and prediction residuals from the first video data to second motion vectors and prediction residuals for the second video data, wherein the decoder is programmed to bypass portions of only B-pictures in the first video data, wherein a portion of a B-picture is bypassed when a measure of prediction residuals and motion vectors for the subset of the first video data and a measure of prediction residuals and motion vectors for the second video data differ by no more than a predetermined threshold value; and
   an encoder coupled to the decoder for generating the second video data from the first video data.

2. The system of claim 1, wherein the encoder is programmed to estimate the second motion vectors from the first motion vectors.

3. The system of claim 2, wherein the second motion vectors are estimated by rounding the first motion vectors.

4. A system for transcoding first video data in a first format to second video data in a second format comprising:
   a decoder for selecting a prediction mode of the second video data from a prediction mode of the first video data and for translating first motion vectors and prediction residuals from the first video data to second motion vectors and prediction residuals for the second video data; and
   an encoder coupled to the decoder for generating the second video data from the first video data;
   wherein the second motion vectors correspond to a mean of the first motion vectors when motion variance across the first video data is below a predetermined threshold and the second motion vectors correspond to a median of the first motion vectors when the motion variance across the first video data is above the predetermined threshold.

5. The system of claim 1, wherein the decoder is programmed to never bypass portions of intra-coded pictures.

6. The system of claim 1, wherein the encoder is programmed to determine the second motion vectors by rounding the first motion vectors.

7. The system of claim 1, wherein the encoder is configured to generate a list of motion vectors for a block of the first video data from motion vectors from other blocks of the first video data and to select from the list of motion vectors a motion vector having a smallest residual error.

8. A system for transcoding first video data in a first format to second video data in a second format comprising:
   means for selecting a prediction mode of the second video data from a prediction mode of the first video data and for translating first motion vectors from the first video data to second motion vectors for the second video data, wherein the means for selecting is programmed to bypass portions of only B-pictures in the first video data, wherein a portion of a B-picture is bypassed when a measure of prediction residuals and motion vectors for the subset of the first video data and a measure of prediction residuals and motion vectors for the second video data differ by no more than a predetermined threshold value; and means for generating the second video data from the first video data, wherein the means for generating is coupled to the means for selecting.

9. The system of claim 8, wherein a bypassed portion of the B-pictures contains only macroblocks of zero vectors.

10. The system of claim 8, wherein the means for generating is programmed to estimate the second motion vectors from the first motion vectors.

11. The system of claim 8, wherein the means for selecting is programmed never to bypass portions of intra-coded pictures.

12. The system of claim 8, wherein the means for selecting is programmed to bypass portions of B-pictures in the first video data.

13. A decoder for transcoding first video data in a first format to second video data in a second format, wherein the decoder is programmed to select a prediction mode of the second video data from a prediction mode of the first video data and to translate first motion vectors from the first video data to second motion vectors for the second video data, wherein the decoder is further programmed to bypass only portions of B-pictures in the first video data, wherein a portion of a B-picture is bypassed when a measure of prediction residuals and motion vectors for the subset of the first video data and a measure of prediction residuals and motion vectors for the second video data differ by no more than a predetermined threshold value.

14. The decoder of claim 13, wherein a bypassed portion of the B-pictures contains all zero-valued pixel data.

15. A decoder for transcoding first video data in a first format to second video data in a second format, wherein the decoder is programmed to select a prediction mode of the second video data from a prediction mode of the first video data and to translate first motion vectors from the first video data to second motion vectors for the second video data, wherein the second motion vectors correspond to a mean of the first motion vectors when motion variance across the first video data is below a predetermined threshold and the second motion vectors correspond to a median of the first motion vectors when the motion variance across the first video data is above the predetermined threshold.

16. The decoder of claim 13, wherein the decoder is further programmed never to bypass portions of intra-coded pictures.

17. A system for transcoding from Blu-ray AVC pictures to MPEG-2 pictures comprising:
a Blu-ray decoder programmed to disable de-blocking for B pictures contained in the Blu-ray AVC pictures and to bypass decoding portions of non-reference B-pictures within the Blu-ray AVC pictures; and
an MPEG-2 encoder coupled to the Blu-ray decoder, wherein the MPEG-2 encoder is programmed to re-use motion information from the Blu-ray AVC pictures when setting motion vectors for the MPEG-2 pictures and to re-use prediction residuals for the bypassed portions of non-reference B-pictures when setting prediction residuals for the MPEG-2 pictures.

18. The system of claim 17, wherein the decoding of a non-reference frame macroblock is bypassed when (a) the macroblock is not intracoded, (b) the macroblock is not a spatial predictor for an intracoded macroblock, (c) motion vectors for the macroblock have reference pictures that are valid MPEG-2 reference pictures, (d) if parts of the macroblock are bi-predicted, then the two predictions are from different directions, and (e) if the macroblock has motions different from 16×16, then the motions meet a similarity threshold and the prediction types for the entire macroblock are the same.

19. The system of claim 17, wherein the decoding of a non-reference field macroblock is bypassed when (a) the macroblock is not intracoded, (b) the macroblock is not a spatial predictor for an intracoded macroblock, (c) motion vectors for the macroblock have reference pictures that are valid MPEG-2 reference pictures, (d) if parts of the macroblock are bi-predicted, then the two predictions are from different directions, and (e) if the macroblock has motions different from 16×16 or 16×8, then the motions within an upper portion of a 16×8 region and a lower portion of the 16×8 region both meet a similarity threshold, the prediction types for the upper portion of the 16×8 region are the same, and the prediction types for the lower portion of the 16×8 region are the same.

20. The system of claim 17, wherein the MPEG-2 encoder is further programmed to determine a list of MPEG-2 motion vector candidates.

21. The system of claim 20, wherein the list of motion vector candidates comprises a mean of motion vectors from sub-blocks of the Blu-ray AVC pictures.

22. The system of claim 20, wherein the list of motion vector candidates comprises a reverse motion vector, a concatenation motion vector, or a combination of both.

23. The system of claim 17, wherein the MPEG-2 encoder is further programmed to translate field motion vectors to frame motion vectors.

24. The system of claim 4, wherein the encoder is programmed to estimate the second motion vectors from the first motion vectors.

25. The system of claim 24, wherein the second motion vectors are estimated by rounding the first motion vectors.

26. The system of claim 4, wherein the decoder is programmed to never bypass portions of intra-coded pictures.

27. The system of claim 4, wherein the encoder is programmed to determine the second motion vectors by rounding the first motion vectors.

28. The system of claim 4, wherein the encoder is configured to generate a list of motion vectors for a block of the first video data from motion vectors from other blocks of the first video data and to select from the list of motion vectors a motion vector having a smallest residual error.

29. The decoder of claim 15, wherein a bypassed portion of the B-pictures contains all zero-valued pixel data.

30. The decoder of claim 15, wherein the decoder is further programmed never to bypass portions of intra-coded pictures.

* * * * *